US008451192B2

(12) United States Patent
Panchal et al.

(10) Patent No.: US 8,451,192 B2
(45) Date of Patent: *May 28, 2013

(54) UTILIZATION OF INTERACTIVE DEVICE-ADJACENT AMBIENTLY DISPLAYED IMAGES

(75) Inventors: Prarthana H. Panchal, Seattle, WA (US); Parker Ralph Kuncl, Seattle, WA (US); Jonathan L. Mann, Seattle, WA (US); Michael Kemery, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/856,311

(22) Filed: Aug. 13, 2010

(65) Prior Publication Data

US 2012/0038552 A1    Feb. 16, 2012

(51) Int. Cl.
*G09G 5/00* (2006.01)
*G09G 3/00* (2006.01)
*G02F 1/1335* (2006.01)
*G03B 21/26* (2006.01)
*G03B 21/14* (2006.01)
*G03B 21/22* (2006.01)
*H04M 1/00* (2006.01)

(52) U.S. Cl.
USPC .............. 345/1.1; 345/32; 345/156; 349/5; 353/28; 353/119; 455/556.1

(58) Field of Classification Search
USPC .......... 345/158; 348/744; 455/556.1; 353/28; 353/119; 349/5
See application file for complete search history.

(56) References Cited

U.S. PATENT DOCUMENTS

| 5,940,149 | A | 8/1999 | Vanderwerf |
| 6,489,934 | B1 | 12/2002 | Klausner |
| 6,568,814 | B2 | 5/2003 | Rodriguez, Jr. et al. |
| 6,614,422 | B1 | 9/2003 | Rafii et al. |
| 7,046,994 | B1* | 5/2006 | Padawer et al. ............... 455/415 |
| 7,242,388 | B2 | 7/2007 | Lieberman et al. |
| 7,539,512 | B2 | 5/2009 | Iida |
| 7,561,935 | B2 | 7/2009 | Chung |
| 7,891,826 | B2 | 2/2011 | Fujinawa et al. |
| 7,896,499 | B2* | 3/2011 | Noba .............................. 353/28 |
| 2002/0075239 | A1* | 6/2002 | Potkonen ...................... 345/168 |
| 2005/0157377 | A1 | 7/2005 | Goldman et al. |
| 2005/0237183 | A1* | 10/2005 | Lamb ....................... 340/539.11 |
| 2006/0172767 | A1* | 8/2006 | Cathey et al. ............. 455/556.1 |
| 2006/0204125 | A1 | 9/2006 | Kempf et al. |
| 2007/0026904 | A1* | 2/2007 | Matsuda ..................... 455/569.2 |
| 2007/0157111 | A1* | 7/2007 | Lensky ......................... 715/784 |
| 2007/0159453 | A1* | 7/2007 | Inoue ............................ 345/156 |

(Continued)

OTHER PUBLICATIONS

Block, Ryan, "iPhone Review Part 1," Jul. 3, 2007, www.endgadget.com.*

(Continued)

*Primary Examiner* — Dwayne Bost
*Assistant Examiner* — Larry Sternbane
(74) *Attorney, Agent, or Firm* — Lee & Hayes, PLLC

(57) ABSTRACT

A telecommunication device configured to project an ambiently displayed image at a location proximate to the telecommunication device on a surface that is substantially parallel to a plane formed by a body of the telecommunication device is described herein. The telecommunication device is further configured to detect an interaction with the ambiently displayed image and perform an action based on the detected interaction.

20 Claims, 17 Drawing Sheets

U.S. PATENT DOCUMENTS

| | | | |
|---|---|---|---|
| 2007/0195294 | A1 | 8/2007 | Willey et al. |
| 2008/0002046 | A1 | 1/2008 | Schumann |
| 2009/0239589 | A1 | 9/2009 | Cathey, Jr. et al. |
| 2009/0303447 | A1* | 12/2009 | Turner et al. ............ 353/51 |
| 2010/0045667 | A1 | 2/2010 | Kornmann et al. |
| 2010/0210312 | A1* | 8/2010 | Kim et al. ............ 455/566 |
| 2010/0302515 | A1 | 12/2010 | Plut |
| 2010/0306022 | A1 | 12/2010 | Plut |
| 2011/0242332 | A1 | 10/2011 | McFadyen et al. |
| 2012/0214546 | A1* | 8/2012 | Osaka ............ 455/556.1 |

OTHER PUBLICATIONS

Blass, "Hands-on with Texas Instruments' cellphone projector", retrieved on Aug. 10, 2010 at <<http://www.engadget.com/2007/09/20/hands-on-with-texas-instruments-cellphone-projector/>>, Engadget, posted Sep. 20, 2007, 4 pages.

"Burst Projector Concept Cell Phone Proposal for LG", retrieved on Aug. 10, 2010 at <<http://www.tuvie.com/burst-projector-concept-cell-phone-proposal-for-lg/>>. Tuvie.com, 14 pages.

"S-Vision Concept Mobile Phone for Business People", retrieved on Aug. 10, 2010 at <<http://www.tuvie.com/s-vision-concept-mobile-phone-for-business-people/>>, Tuview.com, 10 pages.

"Samsung I8520 is an Android phone with built-in projector", retrieved on Aug. 10, 2010 at <<http://www.phonearena.com/htmls/UPDATED-Samsung-I8520-is-an-Android-phone-with-built-in-projector-article-a_9589.html>>, www.phonearena.com, 2 pages.

Thrystan, "LG Burst Projector Phone Comes with Media Editing Video Conferencing", retrieved on Aug. 10, 2010 at <<http://www.concept-phones.com/lg/lg-burst-projector-phone-media-editing-video-conferencing/>>, Concept Phones.com, 6 pages.

Non-Final Office Action for U.S. Appl. No. 12/856,278, mailed on Jun. 29, 2012, Parker Ralph Kunel et al., "Device-Adjacent Ambiently Displayed Image", 10 pages.

* cited by examiner

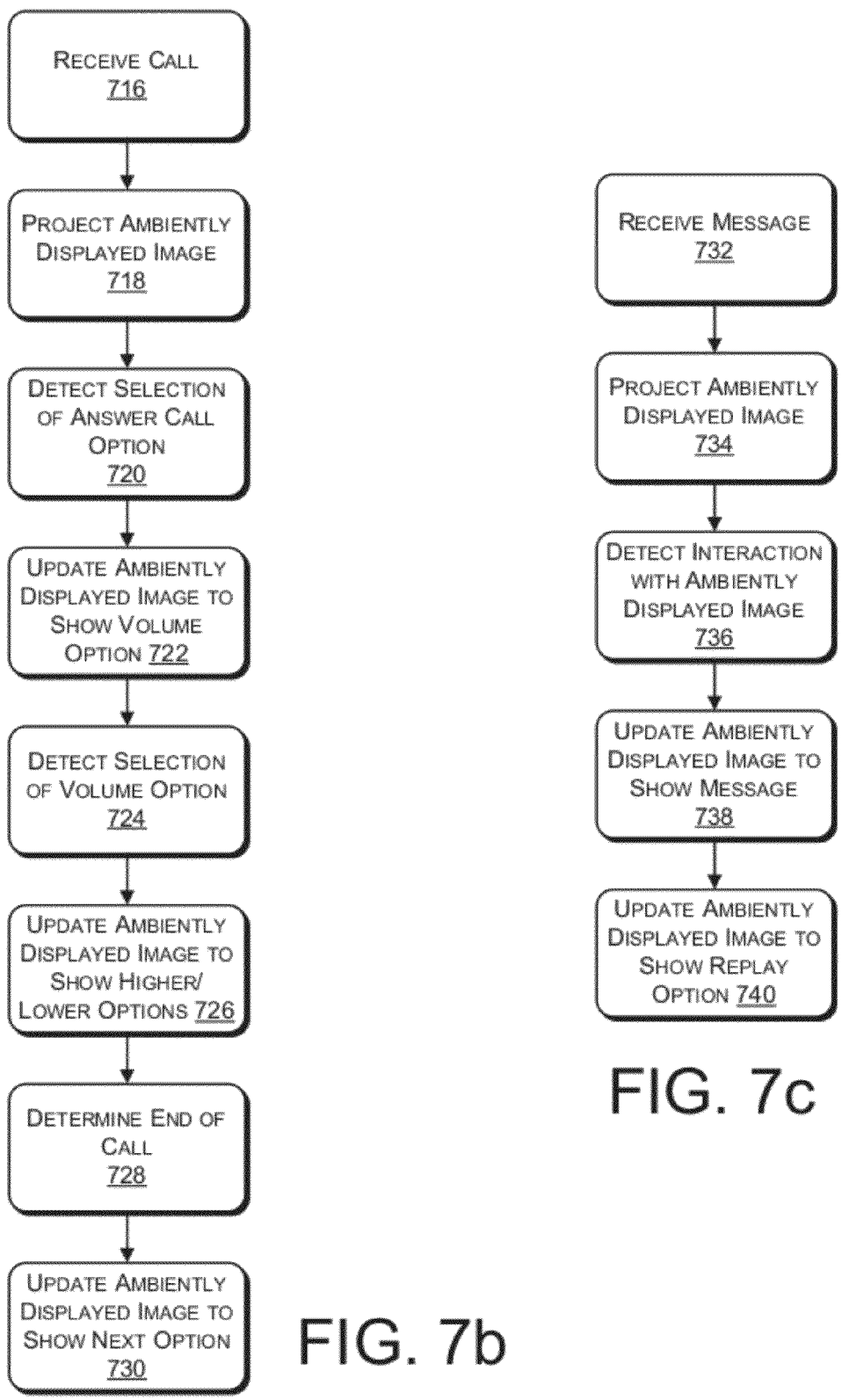

UTILIZATION OF INTERACTIVE DEVICE-ADJACENT AMBIENTLY DISPLAYED IMAGES

RELATED APPLICATIONS

The present application is related to U.S. patent application Ser. No. 12/856,278 entitled "Device-Adjacent Ambiently Displayed Image" filed Aug. 13, 2010.

BACKGROUND

In recent years, telecommunication devices have evolved from offering their users basic telephony services to offering a wide range of communication, data, and other services. For example, telecommunication devices now offer telephony, text messaging, email, calendaring, contacts, user locations, maps, time, cameras, calculators, and Internet browsing. To enable users to interact with these many new features, telecommunication devices have also added input controls, including touch-sensitive display screens. Touch-sensitive display screens are very useful, as they can be reconfigured by telecommunication device software to offer varying controls in different modes and contexts. These display screens also present users with difficulties, however. Telecommunication device users often do not want to use the touch-sensitive display screens because they do not want to make the display screens dirty or because they do not want to scratch the display screens.

In addition, telecommunication devices are also capable of being connected to a number of peripheral devices offering further input controls. For example, telecommunication devices can be connected to keyboards, mice, etc. Telecommunication devices can also be connected to peripheral projector units. These projector units, which are typically larger than the telecommunication devices they connect to, are designed to be placed on a surface and to project an image or other content on a wall that is oblique to the surface or, depending on configuration of the optics of the projector, on the surface itself Projection on the surface, however, requires that the projector unit be located sufficiently distant from the surface. Such distances are often commensurate with the height of the projection unit, which usually exceeds the largest dimension of the telecommunication device. Projection on the surface by an adjacent projector unit typically results in substantial image degradation, including keystoning and blurring of the projected content.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIGS. 7a-7c show flowcharts of operations performed by a telecommunication device to project an ambiently displayed image, detect interaction with the ambiently displayed image, and perform an action based on the interaction, in accordance with various embodiments.

DETAILED DESCRIPTION

Figure 1:
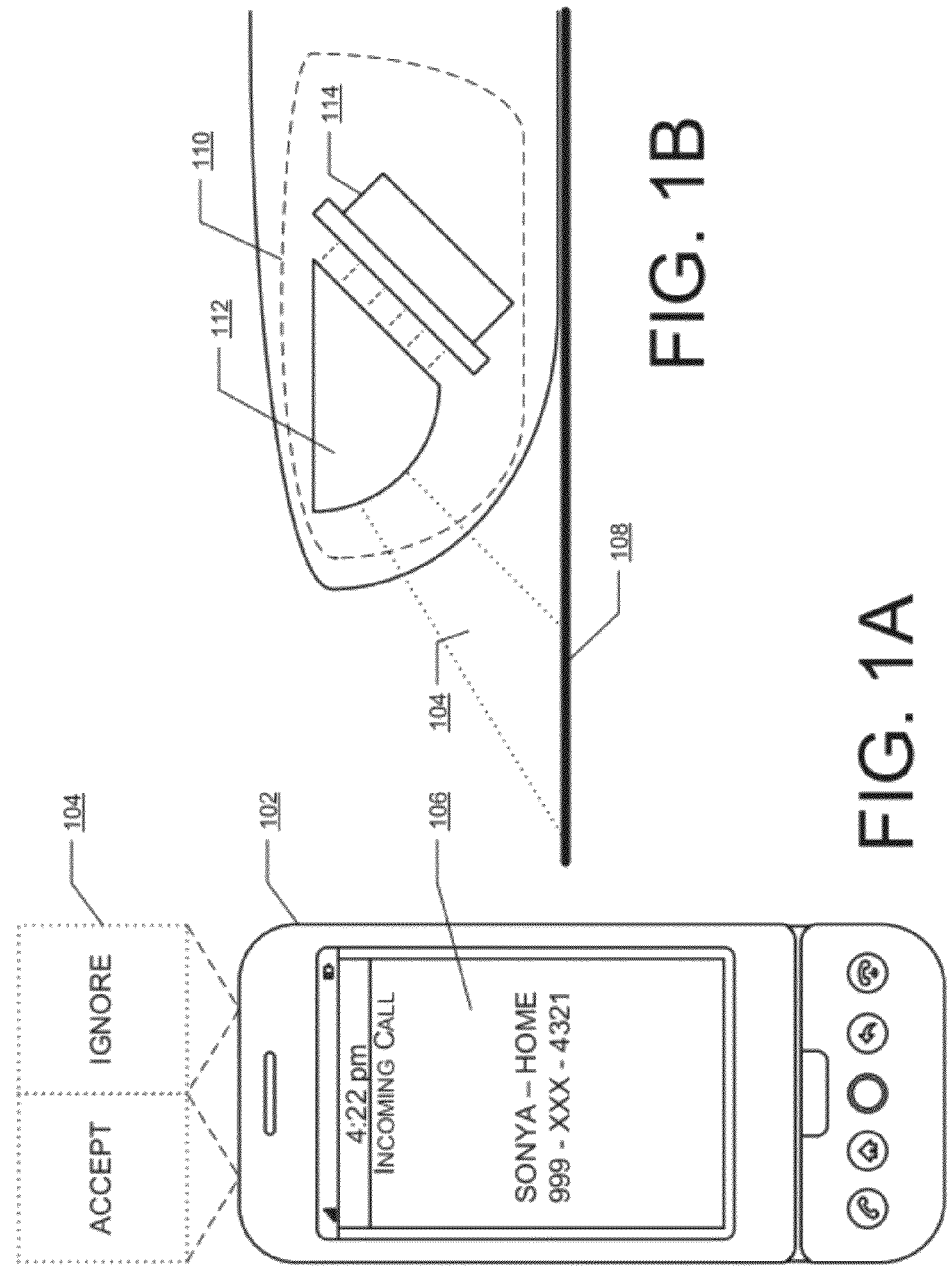
FIGS. 1a-1b show an overview of a telecommunication device that is capable of projecting an ambiently displayed image adjacent to the telecommunication device, in accordance with various embodiments.

This disclosure discusses a telecommunication device equipped with a projection apparatus that is capable of projecting an ambiently displayed image at a location proximate to the telecommunication device on a surface that is substantially parallel to a plane formed by the body of the telecommunication device. The projection apparatus is an internal component located at one end of the telecommunication device and includes both a display component and an optical component. In one implementation, the display component includes one or more liquid crystal displays (LCDs) and light sources and the optical component comprises one or more lenses. Such lenses may comprise, for example, a total internal reflection prism and optional one or more optically powered surfaces. The optical component is capable of projecting the ambiently displayed image at an angle that is oblique to an angle at which the optical component receives light from the display component. As used herein, the term "ambiently displayed image" refers to light projected at the location proximate to the telecommunication device on the substantially parallel surface. While referred to as an image, it is to be understood that the ambiently displayed image may include any one or more images, textual representations, videos, or other graphics.

The telecommunications device further includes logic configured to provide a predistorted image to the projection apparatus. If the projection apparatus projects the original image in an ambiently displayed image, that original image will appear in a distorted shape, such as a trapezoidal shape. The telecommunication device thus predistorts the original image so that, when projected by the projection apparatus in an ambiently displayed image, the image appears without distortion. In various implementations, the predistorted image is generated from the original, starting image by the telecommunication device or by another device based on parameter(s) or algorithm(s).

In some implementations, the telecommunication device is further equipped with one or more interaction components capable of detecting interaction with the ambiently displayed image. The interaction components include, for example, a camera, one or more sensors, such as infrared sensors, or any combination of an emitter and detector. In one implementation, the interaction component(s) are affixed to baffles of the projection apparatus or some other component of the projection apparatus. In other implementations, the sensors or cameras may be mounted or attached to any part of the telecommunication device 102, internal or external. Each interaction component may be associated with an interaction zone, each interaction zone corresponding to all or a part of the ambiently displayed image.

Also, as mentioned, the display component may comprise a plurality of display components, such as a plurality of LCDs, and the optical component may comprise a plurality of optical components, such as a plurality of lenses. In such an implementation, the logic is configured to divide an image that is to be projected in the ambiently displayed image into a number of parts corresponding to the number of display component and optical component pairs and to predistort each part. When the predistorted parts are projected by the projection apparatus in an ambiently displayed image, then, the parts appear as a single image without distortion. Also, to separate the light from the multiple displays, the projection apparatus includes the above-mentioned baffles, the baffles being placed between the display components and the optical components, ensuring that each optical component receives light from a single display component.

The disclosure also discusses techniques for utilizing the ambiently displayed image. In various implementations, these techniques include projecting, by the telecommunication device, the ambiently displayed image on the surface proximate to the telecommunication device, detecting interaction with the ambiently displayed image, and performing an action based on the detected interaction. The interaction includes, for example, tapping, swiping, multi-tap, double tap, press-and-hold, or multiple-finger-press motions and the action includes answering or terminating a call, adjusting volume, reading a message, or accepting a calendar appointment. The ambiently displayed images projected in such techniques include user interface controls, graphics, text, videos, images, screen savers, icons, graphic representations of sound, branding, or visual indicators such as visual ringtones, alerts, or notifications and may be associated with an alarm clock, a calendar, telephony, text messaging, email, voicemail, a timer, content rendered on a display screen of the telecommunication device, a voice recorder, a music player, missed calls, social networking, application notifications, or location information. In some implementations, the projecting of the ambiently displayed image is performed in response to receiving an incoming call or a message.

In various implementations, the techniques further include displaying content through different displays based on telecommunication device display modes and detecting interactions switching the display mode. In a first display mode, the telecommunication device displays content on both a display screen of the telecommunication device and in the ambiently displayed image. In a second display mode, the telecommunication device displays content only in the ambiently displayed image. Interactions switching the display mode include, for example, flipping the phone so that the display screen either faces "down" towards a surface on which the telecommunication device rests or "up" away from the surface.

In some implementations, the techniques include generating the content of the ambiently displayed image as an extension of content displayed on a display screen of the telecommunication device. For example, a user interface displayed on the display screen is divided by the telecommunication device such that some of its components are displayed on the display screen and others in the ambiently displayed image. Also, in some implementations, the content of the ambiently displayed image provides additional details or information associated with an item displayed on the display screen.

Overview

FIGS. 1a-1b show an overview of a telecommunication device that is capable of projecting an ambiently displayed image adjacent to the telecommunication device, in accordance with various embodiments. As shown in FIG. 1a, a telecommunication device 102 is capable of both projecting an ambiently displayed image 104 and of displaying content 106 on a display screen of the telecommunication device 102. FIG. 1b illustrates a surface 108 on which the telecommunication device 102 rests and a projection apparatus 110 of the telecommunication device 102 that is capable of projecting the ambiently displayed image 104 on the surface 108. As further shown in FIG. 1b, the projection apparatus 110 includes an optical component 112 and a display component 114.

In various embodiments, the telecommunication device 102 may be any sort of electronic device, such as a cellular phone, a personal digital assistant (PDA), a personal computer (PC), a tablet computer, a laptop, a gaming device, or a media player. The telecommunication device 102 may further connect to a wireless network, such as a network provided by a telecommunication service provider. Such networks include cellular telecommunications networks, Internet-Protocol-based telecommunications networks (e.g., Voice over Internet Protocol networks), traditional landline or POTS networks, or combinations of the foregoing (e.g., Unlicensed Mobile Access or UMA networks). The telecommunication device 102 may communicate with the network to place and receive calls, to send and receive messages, to browse data content, and to perform any other sort of communication with another device, be it telecommunication device or server, known in the art. In other implementations, the telecommunication device 102 may not connect to any network.

Figure 4:
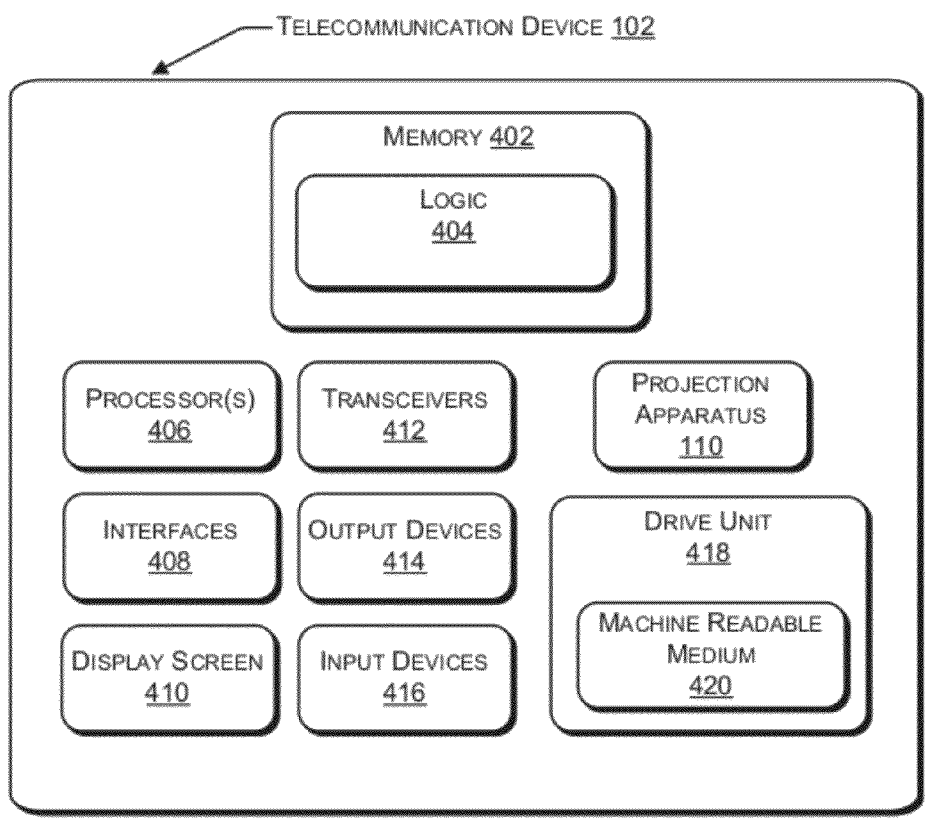
FIG. 4 shows a block diagram of components of an example telecommunication device, in accordance with various embodiments.

The telecommunication device 102 includes both a display screen for displaying content 106 and the projection apparatus 110. The telecommunication device 102 may further include other components as well. An example telecommunication device 102 having such other components is illustrated in FIG. 4 and described in greater detail below.

In various implementations, ambiently displayed image 104 depicts any sort of combination of images, videos, text, or user interface control and may be associated with a component or feature of the telecommunication device 102, such as an alarm clock, a calendar, telephony, text messaging, email, voicemail, a timer, content rendered on a display screen of the telecommunication device, a voice recorder, a music player, missed calls, social networking, application notifications, or location information. Further, the ambiently displayed image 104 may be associated with the content 106 displayed on the display screen of the telecommunication device 102, or may be entirely independent of the content 106. In one implementation, the content of the ambiently displayed image 104 is an extension of the content 106.

In some implementations, the image or content depicted in the ambiently displayed image 104 may be distorted from a starting image to counteract and account for distortion of that image/content caused by its projection. Such distorted images (referred to herein as "predistorted" images due to the distorting of the starting image prior to projection) and their generation are described in FIGS. 2 and 3 and are described further herein with reference to those figures.

The ambiently displayed image 104 may be displayed in response to an event, such as a received call or message, or may simply be "on" and displaying content. In some implementations, the telecommunication device 102 has display modes, some or all of which include projecting the ambiently displayed image 104. For example, in one display mode, content is projected using the ambiently displayed image 104 alone, while in another mode, content is projected using the ambiently displayed image 104 and using a display screen of the telecommunication device 104. In other display modes, the ambiently displayed image may be turned "off." Display mode switching may be affected by interaction with the telecommunication device 102, such as through actuation of a control or movement of the telecommunication device 102.

In various implementations, the ambiently displayed image 104 is interactive. The telecommunication device 102 is equipped with one or more interaction components, such as a camera, sensors, or emitter and detector that capture touch interaction with the surface 108 at locations where the ambiently displayed image 104 is projected. These interaction components enable the ambiently displayed image 104 to be "touch-sensitive," doubling as both a display and an input mechanism. The interaction components are illustrated in FIG. 6 and are described below with reference to that figure.

As shown in both FIGS. 1a and 1b, the location of the ambiently displayed image 104 is adjacent to the telecommunication device 102 on the surface 108. Also, the ambiently displayed image 104 is proximate to an edge of the telecommunication device. In one implementation, an "edge" of the ambiently displayed image 104 (edge as perceived by a viewer) is within ten to twenty millimeters of an edge of the telecommunication device 102. The ambiently displayed image 104 is also projected so that it will appear correctly when projected on a surface that is substantially parallel to a plane formed by the body of the telecommunication device 102. For example, the ambiently displayed image 104 appears properly in FIGS. 1a-1b because the ambiently displayed image 104 is projected onto surface 108 and surface 108 is parallel to a plane formed by the body of telecommunication device 102. Such as surface 108 may be a horizontal surface, such as a table, a vertical surface such as a wall, or any sort of surface. By projecting the ambiently displayed image in this manner, it appears as an extension of the telecommunication device 102, enabling the user to easily see both the telecommunication device 102 and the ambiently displayed image 104 at the same time.

Referring now to FIG. 1b, the ambiently displayed image 104 is shown as being projected by a projection apparatus 110 comprised of optical component 112 and display component 114. As mentioned, the projection apparatus 110 is internal to the telecommunication device 102 and is located at an edge of the telecommunication device 102. For example, as shown in FIGS. 1a-1b, the projection apparatus 110 may be located inside the "top" of the telecommunication device 102 ("top" when the telecommunication device 102 is viewed by a user holding the telecommunication device 102 with its display screen facing the user). The projection apparatus 110 may be located anywhere within the telecommunication device 102, however. In various implementations, the projection apparatus 110 is separated from the exterior of the telecommunication device 102 by a transparent or semi-transparent cover through which the ambiently displayed image 104 is projected. In other implementations, the optical component 112 forms part of the exterior of the telecommunication device 102.

The optical component 112 comprises one or more lenses of varying forms, such as total internal reflection prisms with optional one or more optically powered surfaces. Specific examples of such lenses include prisms, hemispheres, half-spheres, any other sort of three dimensional form, and any sort of combination of these forms. The lenses are fabricated from any one or more kinds of material known in the art that are used to create lenses, such as injection molded plastic. The lenses of the optical component 112 are further designed to be capable of projecting the ambiently displayed image 104 on the surface 108 at the location proximate to the telecommunication device 102. The shape, number, and placement of the lenses is dictated by the angle at which light is received from the display component 114, the position of the display component 114 relative to the optical component 112, the location of the projection apparatus 110 within the telecommunication device 102, and the intended location of the ambiently displayed image 104.

The display component 114 includes at least a light source and a means of forming the light emitted from the light source into some sort of image, video, text, etc. In various implementations, this means includes one or more LCDs of any sort known in the art and the light source includes one or more light emitting diodes (LEDs) placed behind the LCDs. The LEDs cause the LCDs to emit light that forms the ambiently displayed image 104. As is known in the art, LCDs may project light in the form of images measured in pixels. The LCDs selected for the display component 114 may have any known pixel dimension. For example, the display component 114 may have LCDs with a maximum possible number of pixels for the size of the LCDs in order to project as high quality of an ambiently displayed image 104 as possible. In some implementations, a film is employed between the light source and image forming means in order to make better use of the light emitted by the light source.

In addition to the optical component 112 and display component 114, the projection apparatus 110 may include other components. For example, the projection apparatus 110 may include a baffles located between the display component 114 and optical component 112 in order to separate the light emitted by each part of the display component 114 (e.g., each LCD) from the light emitted by other parts. The baffles, the optical component 112, and the display component 114 are further illustrated in FIGS. 5 and 6 and are described below in detail with reference to those figures.

Predistorted Images

Figure 2:
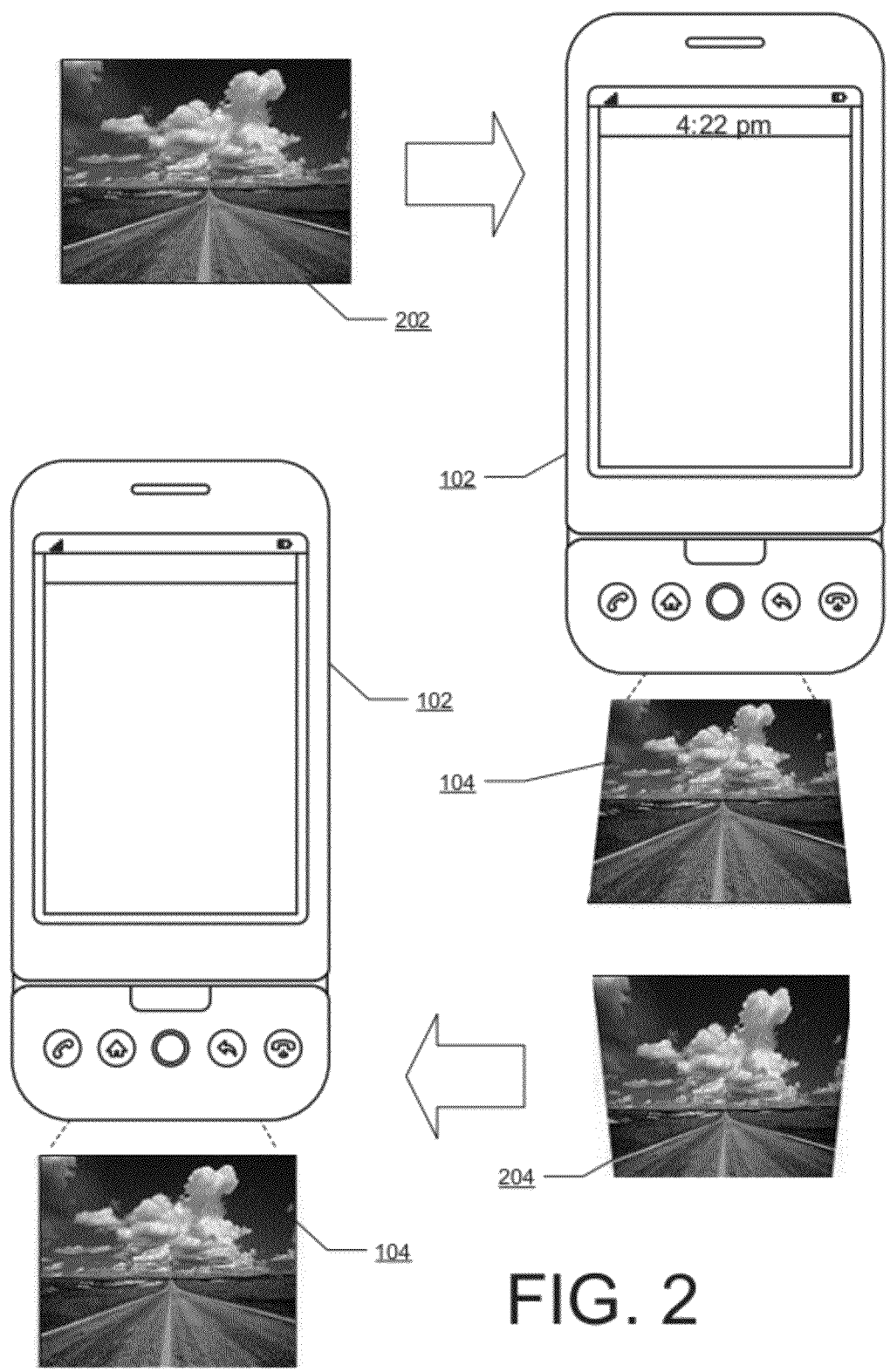
FIG. 2 shows images and the ambiently displayed images projected based on those images, in accordance with various embodiments.

FIG. 2 shows images and the ambiently displayed images 104 projecting those images, in accordance with various embodiments. In FIG. 2, image 202 has a generally rectangular shape of the sort a user might see rendered on the display screen of telecommunication device 102. When this image 202 is projected by the telecommunication device 102 in an ambiently displayed image 104, however, it appears trapezoidal in shape. This distortion of shape is known as keystoning. Keystoning is caused by projection of an image onto a surface that is oblique with respect to optical components projecting the image. Returning to FIG. 1b, the surface 108 is shown as being oblique with respect to the optical component 112 that is projecting the ambiently displayed image 104. Because the surface 108 is oblique, light must travel farther to hit the surface 108 for some parts of the ambiently displayed image 104. And because the light comprising ambiently displayed image 104 hitting the surface 108 has traveled different distances, parts of the ambiently displayed image 104 have different sizes. Parts having traveled farther have larger sizes than parts traveling a shorter distance. The result of this dynamic is the creation of an ambiently displayed image 104 that is substantially trapezoidal in shape. The measurements and angles of this resulting trapezoidal ambiently displayed image 104 are a function of both the measurements of the image 202 and of the angle of the surface 108 with respect to the optical component 112.

Also shown in FIG. 2, a second image 204 is a distorted version of image 202 having a substantially trapezoidal shape. This image 204 ("predistorted image 204") is described throughout this disclosure as "predistorted" because the image 204 has received its substantially trapezoidal shape prior to being provided to the projection apparatus 110. In other implementations, the predistorted image 204 has a substantially hyperbolic shape, a substantially pin cushion shape, a substantially elliptical shape, or any combination of shapes. When this predistorted image 204 is projected by the telecommunication device 102 in an ambiently displayed image 104, it appears without distortion or substantially without distortion in a rectilinear shape. The reason that the ambiently displayed image 104 of predistorted image 204 appears without any keystoning or distortion is that the light which must travel farther to the surface 108 bears a smaller dimensioned part of the predistorted image 204 than the light which travels a shorter distance to the surface 108. In other words, the dimensions of the predistorted image 204 counteract the keystoning effect of being projected onto an oblique-angled surface, resulting in an ambiently displayed image 104 that appears both roughly the same as the starting image 202 and the same as if the plane of the surface 108 were substantially parallel to a plane approximating the projecting surface of the optical component 112.

In some implementations, the predistorted image 204 may account for other sorts of distortion. For example, the optical component 112 may be hemispherical in shape and may thus cause a middle part of the ambiently displayed image 104 to appear "smaller" and the outer parts of the ambiently displayed image 104 to appear "larger." Again, this is because the light constituting the middle part travels a shorter distance from a hemispherical optical component 112 than light constituting the outer parts. To account for this, the predistorted image 204 may be a version of the starting image 202 distorted so that the middle part of the predistorted image 204 appears larger than outer parts. In various implementations, the predistorted image 204 is distorted to account for both the shape of the optical components 112 and to account for keystoning.

Figure 3:
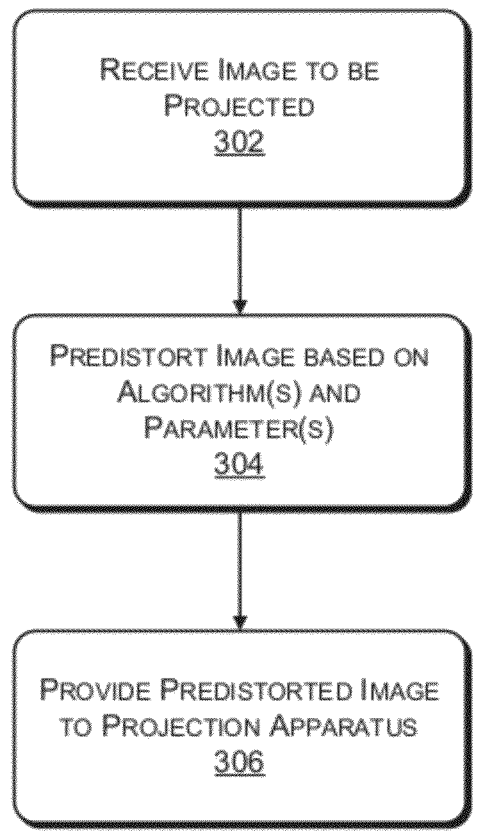
FIG. 3 shows a flowchart of operations performed by a telecommunication device to generate a predistorted image, in accordance with various embodiments.

The generating and providing of the predistorted image 204 are illustrated in FIG. 3, which shows a flow diagram of operations. In the flow diagram, the operations are summarized in individual blocks. The operations may be performed in hardware, or as processor-executable instructions, or logic (software or firmware) that may be executed by one or more processors. Such logic is illustrated in FIG. 4 and mentioned below with reference to that figure.

At block 302, the starting image 202 to be predistorted is received by the telecommunication device 102. This image 202 may be received from another computing device via the above-described network or may be received from a local application. For example, the image 202 could be an image captured by a camera of the telecommunication device 102. The image 202 could also be an image retrieved from an image library.

At block 304, the telecommunication device 102 predistorts the image 202 based on at least one of algorithm(s) or parameter(s). The algorithms or parameters may have been selected based on features of the optical component 112, the location of the projection apparatus 110 within the telecommunication device 102, an estimated location of the ambiently displayed image 104 on the surface 108 and an estimated angle of the surface 108 with respect to the optical component 112. Based on these metrics and data, the algorithms or parameters are tuned or selected such that the resulting algorithms or parameters, when applied to the image 202, result in the generation of the predistorted image 204. Such algorithms or parameters thereby account for the distortion images undergo when projected by the projection component 110.

In various implementations, the receiving and predistorting of blocks 302 and 304 may instead be performed by another computing device and its resulting predistorted images 204 may then be provided to the telecommunication device 102. In one implementation, some or all of the predistorted images 204 used by the telecommunication device 102 may be pre-loaded on the telecommunication device 102.

Also, some or all of the predistorted images 204 may be stored for subsequent retrieval, as some or all of the predistorted images 204 may be frequently reused.

In some implementations, before predistorting the image 202 at block 304, the telecommunication device may divide the image 202 into a number of parts, the number corresponding to a number of image forming means or light sources comprising the display component. For example, if the display component comprises four LCDs, the telecommunication device 102 may divide the image 202 into four parts. Predistorted images 204 for each part are then generated at block 304, and these predistorted images 204, when projected, form a single image 202 in the ambiently displayed image 104 without distortion.

At block 306, the telecommunication device provides the predistorted image or images 204 to the projection apparatus 110 for display as ambiently displayed image 104. In some implementations, this providing may include invoking an interface or device driver of the projection apparatus 110.

Example Device

FIG. 4 shows a block diagram of components of an example telecommunication device 102, in accordance with various embodiments. As shown, the telecommunication device 102 may include a memory 402, the memory storing logic 404. The telecommunication device 102 further includes the projection apparatus 110, processor(s) 406, interfaces 408, a display screen 410, transceivers 412, output devices 414, input devices 416, and drive unit 418 including a machine readable medium 420.

In various embodiments, memory 402 generally includes both volatile memory and non-volatile memory (e.g., RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium). Additionally, in some embodiments, memory 402 includes a SIM (subscriber identity module)

card, which is a removable memory card used to identify a user of the telecommunication device 102 to a service provider network. Memory 402 can also be described as computer storage media and may include volatile and nonvolatile, removable and non-removable media implemented in any method or technology for storage of information, such as computer readable instructions, data structures, program modules, or other data.

The logic 404 stored in memory 402 is configured to perform a number of the operations described herein. Logic 404 may be configured to perform the operations illustrated in FIG. 3 to generate and provide a predistorted image as well as some or all of the operations illustrated in FIG. 7 to project an ambiently displayed image, detect interaction with the ambiently displayed image, and perform an action based on the interaction; some or all of the operations illustrated in FIG. 10 to detect interaction and affect a display mode switch; and some or all of the operations illustrated in FIG. 12 to generate the ambiently displayed image as an extension of content 106 displayed on the display screen 410. The Logic 404 comprises computer-executable instructions to be read by the processor 406 to perform these operations. These instructions may comprise any one or more modules, applications, processes, or threads and may be stored entirely or partially in memory 402.

The projection apparatus 110 is also shown in FIGS. 1 and 5 and is described herein in detail with reference to those figures.

In some embodiments, the processor(s) 406 is a central processing unit (CPU), a graphics processing unit (GPU), or both CPU and GPU, or other processing unit or component known in the art.

In various embodiments, the interfaces 408 are any sort of interfaces known in the art. Interfaces 408 include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the telecommunication device 102 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into telecommunication device 102.

In various embodiments, the display screen 410 is a liquid crystal display or any other type of display screen commonly used in telecommunication devices. For example, display screen 410 may be a touch-sensitive display screen, and can then also act as an input device or keypad, such as for providing a soft-key keyboard, navigation buttons, or the like. The display screen 406 may, in some implementations, be capable of rendering the content 106 described in greater detail herein.

In some embodiments, the transceivers 412 include any sort of transceivers known in the art. For example, transceivers 412 may include a radio transceiver and interface that performs the function of transmitting and receiving radio frequency communications via an antenna. The radio interface facilitates wireless connectivity between the telecommunication device 102 and various cell towers, base stations and/or access points.

In some embodiments, the output devices 414 include any sort of output devices, such as a display screen (already described as display screen 410), a projector apparatus for projecting an ambiently displayed image (already described as projector apparatus 110), speakers, a vibrating mechanism, or a tactile feedback mechanism. Output devices 414 also include ports for one or more peripheral devices, such as headphones, peripheral speakers, or a peripheral display.

In various embodiments, input devices 416 include any sort of input devices. For example, input devices 416 may include a microphone, a keyboard/keypad, a touch-sensitive display screen (such as the touch-sensitive display screen described above), or an interactive ambiently displayed image (described in greater detail above and below with respect to ambiently displayed image 104). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 420 stores one or more sets of instructions (e.g., software) embodying any one or more of the methodologies or functions described herein. The instructions may also reside, completely or at least partially, within the memory 402 and within the processor 406 during execution thereof by the telecommunication device 102. The memory 402 and the processor 406 also may constitute machine readable media 420.

Example Projection Apparatuses

Figure 5A:
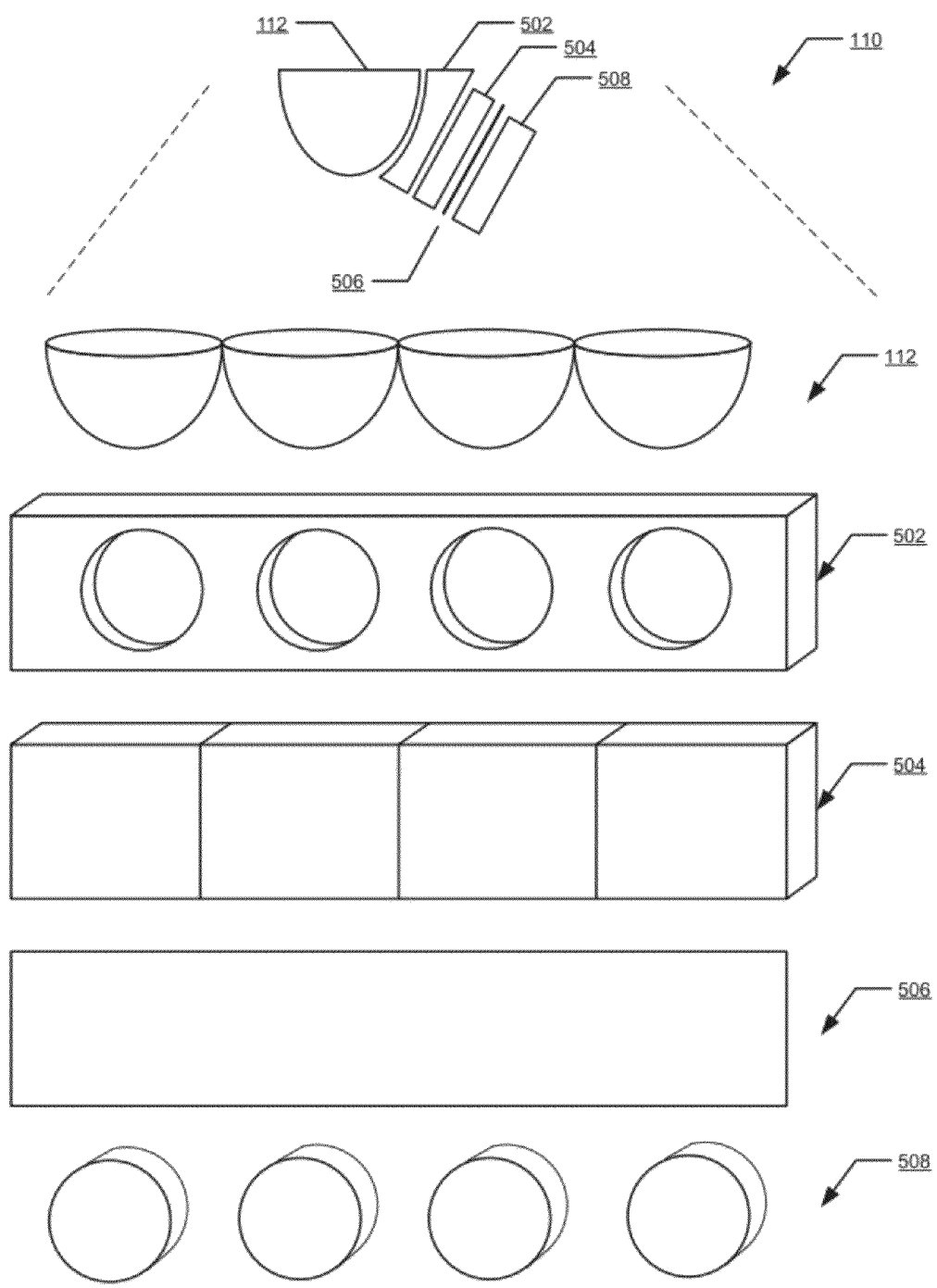
FIGS. 5a-5b show component diagrams of the components of projection apparatuses of a telecommunication device, in accordance with various embodiments.
Figure 5B:
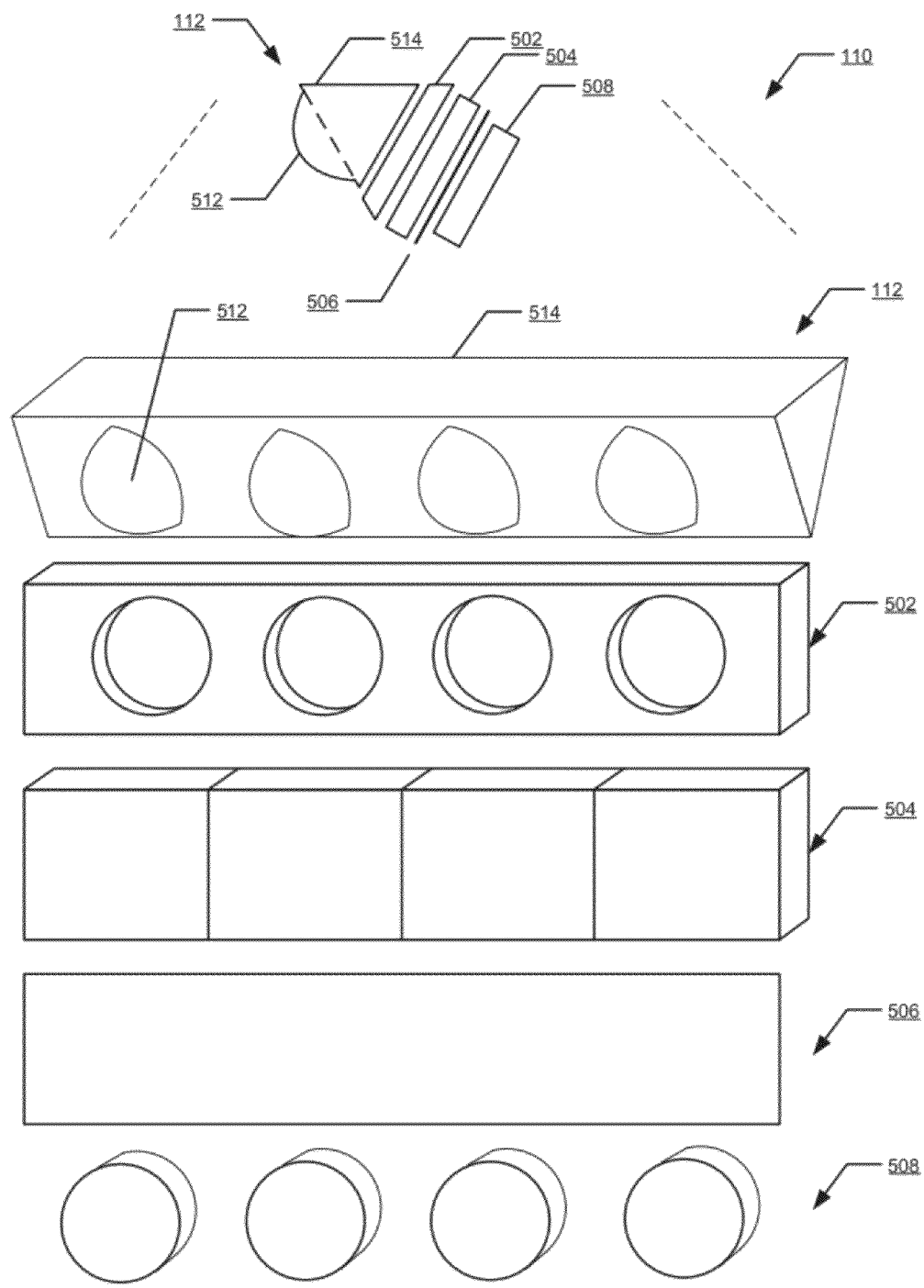

FIGS. 5a-5b show component diagrams of the components of projection apparatuses of a telecommunication device, in accordance with various embodiments. As shown in FIGS. 5a-5b, the projection apparatus 110 includes a plurality of optical components 112 coupled to a plurality of display components 114 by a baffles 502. The display components 114 in turn multiple LCDs 504, a film or films 506, and multiple light sources 508. In FIG. 5a, the optical components 112 are a plurality of half-sphere lenses. In FIG. 5b, the optical components 112 are a plurality of lenses, each lens including a triangular prism 510 and a hemispherical part 512. The projection apparatus 110 may be coupled to other components of the telecommunication device 102, such as the processor 406, by any number of means known in the art.

In both FIGS. 5a and 5b, the optical components 112 are lenses, such as a total internal reflection prisms with optional one or more optically powered surfaces. In various implementations, such lenses comprise a micro lens array fabricated from injected molded plastic. An advantage of using multiple lenses is that more light emitted from the display components 114 is captured and projected in the ambiently displayed image 104. In other implementations, other materials and numbers of lenses may be used. As shown in FIGS. 5a and 5b, the lenses comprising the optical components 112 are parallel with respect to each other rather than in sequence. Because the lenses are parallel, they do not emit and receive light from each other as a set of lenses in sequence would. In some implementation, lenses in sequence may be used instead of or in addition to the micro lens array. Such lenses in sequence may receive light from and emit light to each other. For example, a first lens may receive light emitted from a display component 114 and in turn emit the light to a second lens in sequence, the second lens then emitting the ambiently displayed image 104. Lenses in sequence may create an optical component 112 with a larger overall size, however, then a micro lens array as shown in FIGS. 5a and 5b.

In FIG. 5a, each optical component 112/lens of the micro lens array is a half-sphere. Half-sphere lenses have a relatively smaller size, enabling the lenses to easily fit within the telecommunication device 102. Such lenses perform internal reflection of the light received from the display components 114 such that the light is omitted by each lens at an angle that is oblique with respect to an angle at which the light was received.

In FIG. 5b, each optical component 112/lens has a triangular prism 510 and a hemispherical part 512. The triangular prism 510 and hemispherical part may form one integrated whole rather than discrete parts. In fact, the lenses collectively may form an integrated whole (e.g., one form of molded plastic) rather than discrete parts. Each triangular prism may be a total internal reflection prism. Each lens having the triangular prism 510 and hemispherical part 512 perform internal reflection of the light received from the display component 114 such that the light is emitted by the hemispherical part 512 at an angle that is oblique with respect to an angle at which the light was received by the triangular prism 510.

In various implementations, the baffles 502 illustrated in FIGS. 5a and 5b are also made of molded plastic as a single integrated piece. The baffles are shaped so as to fit on one side against the optical components 112 and on the other against the display components 114. The baffles 502 may fit flush against one or both of the components 112 and 114 or may be proximate to one or both of the components 112 and 114. The baffles 502 may include one aperture for each optical component 112/LCD 504 pair. For example, if the projection apparatus 110 includes four LCDs 504 and four optical components 112, the baffles 502 may include four apertures. Such apertures may have a circular or ovular shape, a square or rectangular shape, or any other sort of shape. In other implementations, the baffles 502 may have any other sort of shape or aperture so long as the baffles 502 separates the light emitted from the multiple LCDs 504 from each other.

As further shown in FIGS. 5a-5b, the display component 114 includes multiple LCDs 504 in an array parallel to that of the optical components 112. Each LCD 504 may be any size or have any number of pixels. In one implementation, each LCD 504 has a five millimeter by five millimeter size corresponding to a sixteen pixel by sixteen pixel display. The size of the collective LCDs 504 may be a function of a desired size of the ambiently displayed image 104. For example, if the ambiently displayed image 104 is to have a certain size, and the ambiently displayed image 104 is magnified such that it is twice as large as the collective LCDs 504, the LCDs 504 are selected in accordance with the magnification and desired ambiently displayed image 104 size. The LCDs 504 may be monochromatic or multi-colored, with each LCD 504 having the same color capabilities or with some LCDs 504 being monochromatic while others are multi-colored. In various implementations, the baffles 502 and optical components 112 use only a part of each LCD 504, such as seventy-five to eighty percent of the display capacity of each LCD 504. For example, if the LCDs 504 are square and the baffles 502 has circular apertures, some light emitted from the LCDs 504 will not pass through the apertures of the baffles 502. In some implementations, the LCDs 504 may also be relatively power efficient, such as more power efficient than the display screen 410 of the telecommunication device 102. In other implementations, the telecommunication device 102 may utilize static image templates in the display component 114 in place of the LCDs 504. The static image templates would simply impose a filter on the light emitted from the light source 508, thereby creating a shape where the light is blocked.

In various implementations, the display component 114 includes an optional film 506 between the LCDs 504 and the light sources 508. The film may be any sort of light refracting material known in the art. For example, the film 506 may have high light collection efficiency by means of recycling the received light. This recycling is achieved by internal refraction of the light received from the light sources 508. Recycling of light may be desirable when the display component 114 includes LCDs 504 since LCDs with polarizers use only half the light ordinarily emitted by the light sources 508.

The light sources 508 shown in FIGS. 5a-5b may be a single source 508 illuminating the multiple LCDs 504 or may comprise a plurality of light sources 508 corresponding to the multiple LCDs 504. In some implementations, the light sources 508 may be an LED or LEDs, such as a three color LED or LEDs. The luminous intensity of each LED may be between five hundred milli-candelas (mcd) and twenty-two hundred mcd per color. Also, in some implementations, the light sources 508 are capable of modulating brightness, enabling the brightness of the light sources 508 to be customized based on a desired brightness of the ambiently displayed image 104.

Example Interaction Components

Figure 6A:
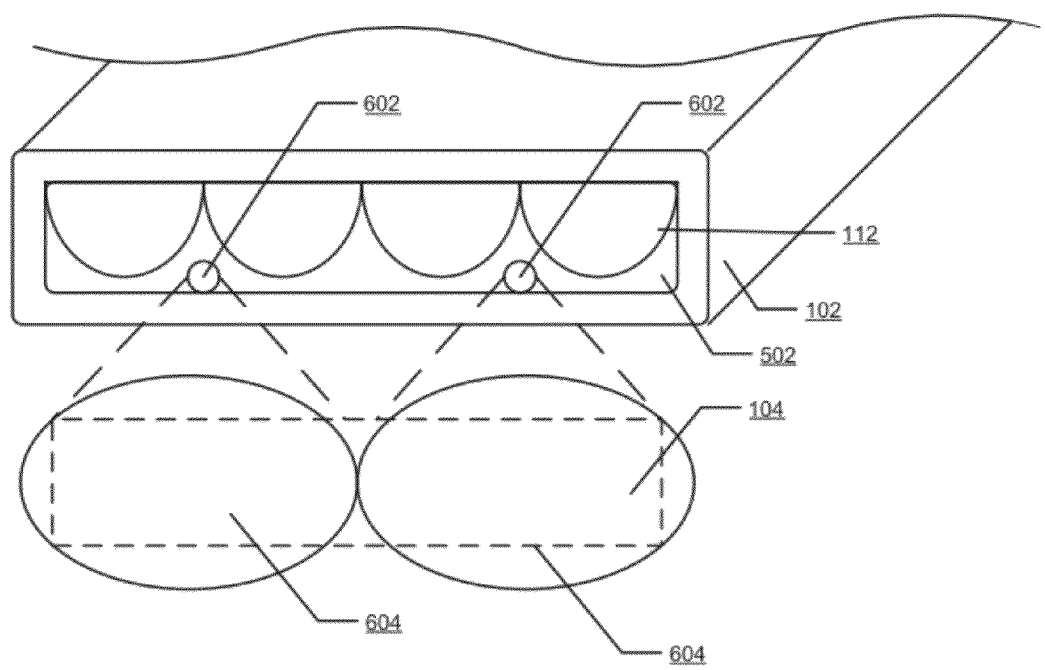
FIGS. 6a-6b show component diagrams of interaction sensing components, in accordance with various embodiments.
Figure 6B:
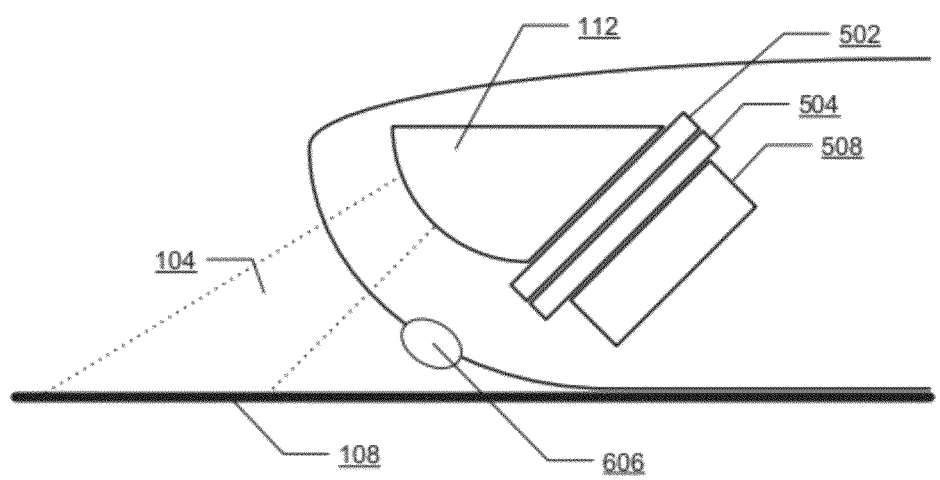

FIGS. 6a-6b show component diagrams of interaction sensing components, in accordance with various embodiments. As shown in FIG. 6a, one or more sensors 602 are equipped to a baffles 502 of the projection apparatus 110 of the telecommunication device 102. These sensors 602 monitor interaction zones 604 associated with the ambiently displayed image 104 to detect interaction with the ambiently displayed image 104. FIG. 6b illustrates an alternative implementation where a camera 606 affixed to a cover of the telecommunication device 102 captures images of interaction with the ambiently displayed image 104. In other implementations, both sensors 602 and the camera 606 or any emitter-detector combination are used.

In various implementations, the sensors 602 may be any sort of sensors known in the art. For example, the sensors 602 may be infrared sensors emitting invisible infrared light and detecting any interaction with or blocking of the emitted light. Any number of such sensors 602 may be used. As shown in FIG. 6a, two sensors 602 are used to create two interaction zones 604. These sensors are affixed to the baffles 502 at locations between the optical components 112. These locations prevent the parts of the projection apparatus 110 from blocking the sensors 602 and prevent the sensors 602 from blocking the ambiently displayed image 104. In other implementations, the sensors 602 are affixed to other locations.

The interaction zones 604 are created by the emission of infrared light by the sensors 602 or by some other mechanism. When a user interacts with that infrared light or other mechanism creating the interaction zones 604, the sensors 602 detect the interaction. In various implementations, the interaction zones 604 each comprise a half of the ambiently displayed image 104, allowing the ambiently displayed image 104 to have two user-interactive controls, such as the "Accept" and "Ignore" buttons depicted in FIG. 1a. In other implementations, other numbers of sensors 602 and corresponding interaction zones 604 enable the ambiently displayed image 104 to provide a different number of user-interactive controls. While FIG. 6a depicts the interactions zones 604 as each encompassing half of the ambiently displayed image 104, each interaction zone 604 may extend beyond the boundaries of the ambiently displayed image 104 in one or more directions.

FIG. 6b shows the use of a camera 606 affixed to the cover of the telecommunication device 102. The camera 606 may be configured to capture images of the ambiently displayed image 104 on some predetermined time basis while the ambiently displayed image 104 is being rendered. These images are then provided to logic, such as logic 404, to determine whether a user has interacted with the ambiently displayed image 104. In other implementations, rather than taking pictures on a predetermined time basis, the telecommunication device 102 is equipped with both camera 606 and a sensor 602. The sensor 602 detects interaction with some part of the ambiently displayed image 104 and the camera 606 takes a picture of the ambiently displayed image 104. With a camera 606, the entire ambiently displayed image 104 may be considered a single interaction zone 604. The logic of the telecommunication device 102 is then responsible for determining the part of the ambiently displayed image 104 that has been interacted with from the captured images.

Interactions with the Ambiently Displayed Image

Figure 7A:
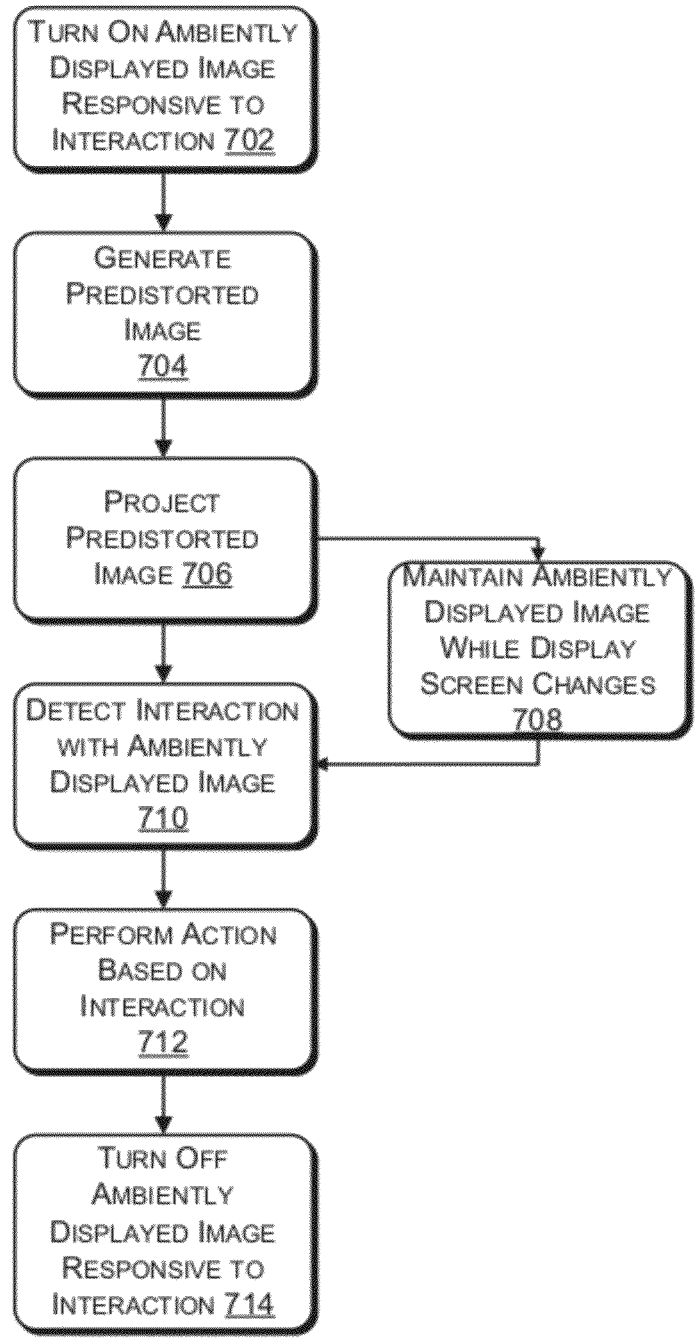

FIG. 7a shows a flowchart of operations performed by a telecommunication device 102 to project an ambiently displayed image 104, detect interaction with the ambiently displayed image 104, and perform an action based on the interaction, in accordance with various embodiments. FIGS. 7b and 7c show specific examples of the operations of FIG. 7a performed in the context of an incoming call or a received message, respectively. In the flow diagrams, the operations are summarized in individual blocks. The operations may be performed in hardware, or as processor-executable instructions, or logic (software or firmware) that may be executed by one or more processors. Such logic is illustrated in FIG. 4 and mentioned above with reference to that figure.

As shown in FIG. 7a at block 702, the telecommunication device 102 first turns on the ambiently displayed image 104 in response to a user interaction with the telecommunication device 102. For example, the telecommunication device 102 may be equipped with a hard key located somewhere on the telecommunication device 102 or a soft key displayed on the display screen 410 of the telecommunication device 102. The hard key or soft key cause the ambiently displayed image 104 to be turned on or off when pressed. In other embodiments, the telecommunication device 102 utilizes another mechanism for turning on or off the ambiently displayed image 104. For example, the telecommunication device 102 may have a gyroscope that senses a motion, such as shaking, or a change in position, allowing the users to shake or move the telecommunication device 102 in some manner to turn on or off the ambiently displayed image 104.

In other implementations, the ambiently displayed image 104 is always on or is turned on or off in response to commands received from the telecommunication device platform or applications. For example, as shown in FIGS. 7b and 7c, the telecommunication device 102 may be turned on in response to receiving a call or message. After the call or message, in some implementations, the ambiently displayed image 104 is then turned back off.

In yet other implementations, both user interaction and commands from a platform or application are able to turn the ambiently displayed image 104 on or off. Also, in one implementation, the user may interact with the telecommunication device 102 to turn the ambiently displayed image 104 on, resulting in first content being projected in the ambiently displayed image 104, and then the telecommunication device 102 may receive an incoming call, causing the ambiently displayed image 104 to be "turned on again" or updated, resulting in second content being projected in the ambiently displayed image 104.

At block 704, the telecommunication device 102 generates a predistorted image or predistorted version of other content to be depicted in the ambiently displayed image 104. The generation of the predistorted image/content is illustrated in FIGS. 2 and 3 and is described above with reference to those figures. As mentioned above, the image/content of the ambiently displayed image 104 are predistorted to account for distortions experienced by the image/content when projected by the projection apparatus 110 on the surface 108 in the ambiently displayed image 104.

At block 706, the telecommunication device 102 projects the ambiently displayed image 104 proximate to the telecommunication device 102 on the surface 108, the surface 108 being substantially parallel to a plane formed by the body of the telecommunication device 102. The location of the ambiently displayed image 104 and the projection apparatus 110 used in projecting the ambiently displayed image 104 are described above with reference to FIGS. 1a-1b and 5. The appearance of the ambiently displayed image 104 when projected may also vary based on the characteristics of the surface that the ambiently displayed image 104 is projected on.

In various implementations, the content of the ambiently displayed image 104 includes at least one of user interface controls, graphics, text, videos, images, screen savers, icons, graphic representations of sound, branding, or visual indicators such as visual ringtones, alerts, or notifications. The choice of user interface controls, graphics, text, videos, images, screen savers, icons, graphic representations of sound, branding, visual indicators such as visual ringtones, alerts, or notifications, or of some combination of two or more may vary based on an application or feature context of the telecommunication device 102 or on user interaction context determined by user interactions with the ambiently displayed image 104. In some implementations, the ambiently displayed image 104 projected at block 707 is associated with an application or feature such as an alarm clock, a calendar, telephony, text messaging, email, voicemail, a timer, content rendered on a display screen of the telecommunication device, a voice recorder, a music player, missed calls, social networking, application notifications, or location information. The telecommunication device application or feature associated with the projected ambiently displayed image 104 may be a function of an execution context of the telecommunication device 102. For instance, if an email application is active on the telecommunication device 102, the ambiently displayed image 104 may depict a preview of a most recently received message. In other implementations, the content of the ambiently displayed image 104 may be a function of a user interaction context, such as user interaction with a predetermined menu of options depicted in the ambiently displayed image 104. For example, when the ambiently displayed image 104 is first turned on, a horizontally-scrollable menu of options may be presented to the user. The horizontal scrolling may occur automatically or may occur in response to a user interaction with the ambiently displayed image 104, such as a scrolling action.

In further implementations, the ambiently displayed image 104 projected at block 706 is an extension of a user interface displayed on a display screen 410 of the telecommunication device 102, part of the user interface being displayed on the display screen 410 and part being displayed in the ambiently displayed image 104. For example, if the user interface would not fit on the display screen 410, a number of the user interface components that will not fit may instead be depicted in the ambiently displayed image 104.

At block 708, the image or content depicted in the ambiently displayed image 104 remains the same while the images or content depicted on the display screen 410 of the telecommunication device 102 changes. For example, the ambiently displayed image 104 may provide the user with a menu of options, such as a call option and a message option, that are displayed regardless of what is displayed on the display screen 410. Thus, a user may browse the Internet on the display screen 410, go back to a main menu shown on the display screen 410, then check the temperature user a temperature application, and the ambiently displayed image 104 may show the show the same options during each of these views and interactions.

At block 710, an interaction component of the telecommunication device 102, such as the sensors 602 or camera 606 discussed above, detect interaction with the ambiently displayed image 104. In various implementations, the interaction may be any sort of touch motion. For example, the user may press on a part of the ambiently displayed image 104 or make a swiping motion across the ambiently displayed image 104. The pressed part of the ambiently displayed image may be in an interaction zone 604, as discussed above. A swiping motion might cross multiple interactions zones, indicating an intended action other than a press. For example, if the ambiently displayed image 104 depicts a scrollable list of menu options, a swiping motion crossing multiple interaction zones 604 may be interpreted as a desire to see different menu options and may cause the ambiently displayed image 104 to be updated with different menu options. A pressing motion in a single interaction zone 604, however, may be interpreted by the telecommunication device 102 as a selection of a menu option depicted in that interaction zone 604 of the ambiently displayed image 104. In other implementations, rather than touch interaction, the user can speak a selection and a speech recognition component of the telecommunication device 102 or of another device may interpret the speech and associate it with part of the ambiently displayed image 104. For example, if the ambiently displayed image 104 shows "Accept" and "Ignore" options and the user speaks "Accept", the telecommunication device 102 treats the speech that same as it would treat a press of the "Accept" option.

At block 712, the telecommunication device 102 performs an action based on the detected user interaction with the ambiently displayed image 104. Such actions could include answering or terminating a call, adjusting volume, reading a message, accepting a calendar appointment, or any other sort of action that the telecommunication device 102 is capable of performing. In some implementations, in addition to performing the action, the telecommunication device 102 may also update the ambiently displayed image 104 with new images/content. For example, if the ambiently displayed image 104 showed a calendar application menu option that was selected by the user, the telecommunication device 102 would invoke in response that calendar application, causing it to have user interfaces of the calendar application displayed on display screen 410. The telecommunication device 102 would also update the ambiently displayed image 104 to show a different set of options, such as "New Appt" and "Today's Appts" ("Appt" is short for appointment).

At block 714, the ambiently displayed image 104 is turned off in response to a user interaction with the telecommunication device 102. Interactions such as key presses, shaking, and movements are discussed above at block 702 as ways to turn the ambiently displayed image 104 on. In some implementations, the same mechanism can be used to turn the ambiently displayed image 104 on and off. In other implementations, different mechanisms may be used.

Figure 8:
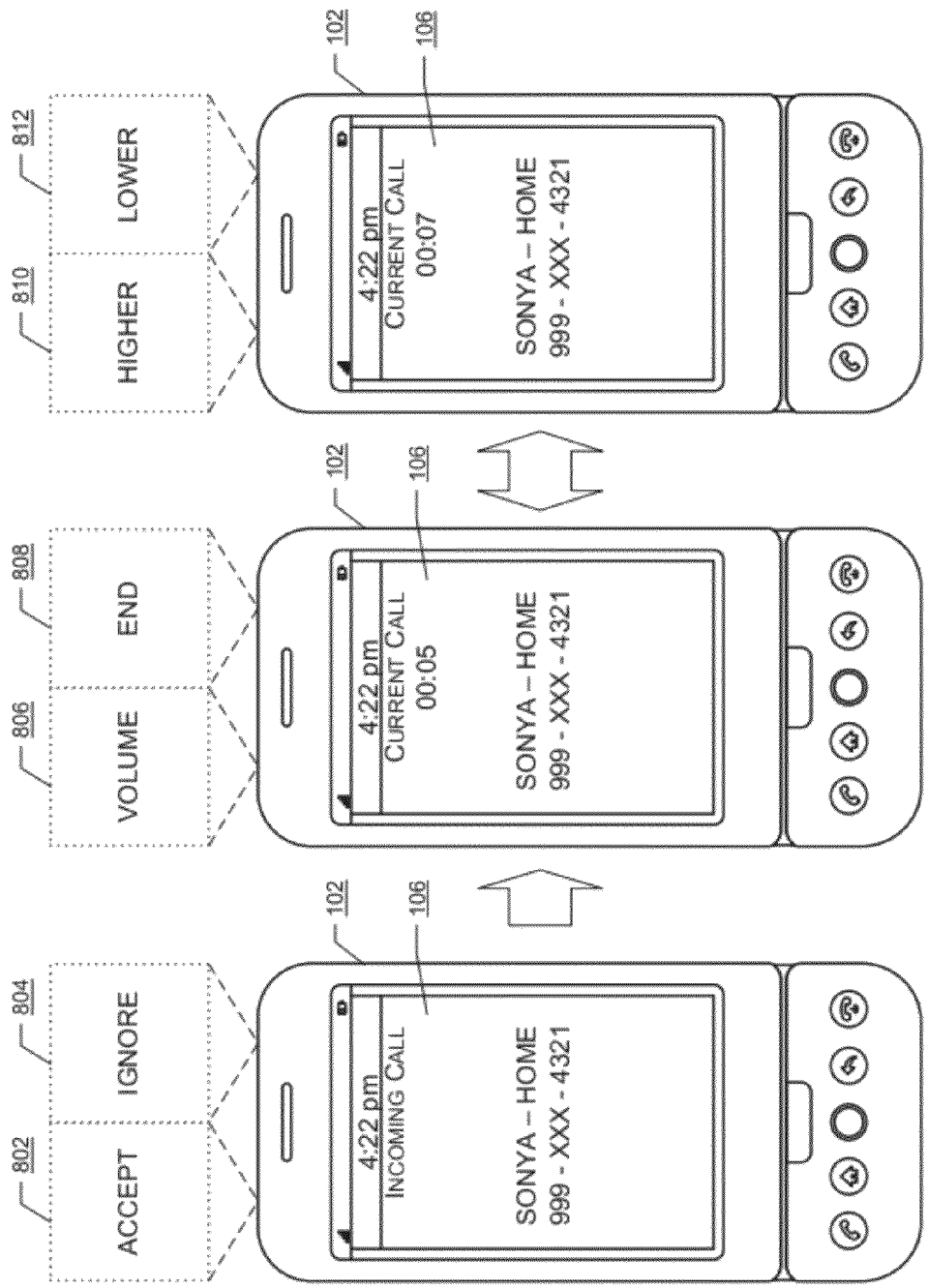
FIG. 8 shows a sequence of ambiently displayed images associated with an incoming call that are updated based on interactions with previous ambiently displayed images, in accordance with various embodiments.

In FIG. 7b, a flowchart of operations involving ambiently displayed image 104 that are performed in response to receiving an incoming call is shown, in accordance with various embodiments. To better illustrate the operations shown in FIG. 7b, example ambiently displayed images 104 and the sequence of those ambiently displayed images 104 are illustrated in FIG. 8. The discussion of FIG. 8 is included with the discussion of FIG. 7b.

At block 716, the telecommunication device 102 receives an incoming call. The incoming call may be received via any sort of network such as a cellular network or wireless data network.

At block 718, the telecommunication device 102 projects in the ambiently displayed image 104 a set of options enabling the user to answer or ignore the incoming call. For example, as shown in FIG. 8, the telecommunication device 102 may project an "Answer" option 802 and an "Ignore" option 804 in the ambiently displayed image 104. At the same time, the telecommunication device 102 may display on the display screen 410 other information about the incoming call, such as the incoming caller's name and phone number 106. If the user selects the "Ignore" option 804 by, e.g., pressing on "Ignore" 804, the incoming call is not answered and is either terminated or sent to voicemail based on service capabilities and user preferences.

At block 720, the telecommunication device 102 detects a user interaction with "Answer" 802. Such an interaction could include pressing on "Answer" 802 or speaking "answer", as described above.

At block 722, the telecommunication device 102 updates the ambiently displayed image 104 to show at least a volume option enabling the user to be provided with controls for adjusting the volume of the speaker projecting the voice of the conversation partner in the voice call. For example, as shown in FIG. 8, the updated ambiently displayed image 104 includes both a "Volume" option 806 and an "End" option 808 for ending the voice call. In various implementations, simultaneously with updating the ambiently displayed image 104, the telecommunication device 102 answers the voice call. Thus, as shown in FIG. 8, the content 106 displayed on the display screen 106 may now include a timer showing a duration for the voice call. In some implementations, if the user answers the call by pressing "Answer" 802, the telecommunication device 102 automatically answers the call in speaker phone mode. The mode that the call is answered in, however, may be determined in accordance with user settings. If the user selects the "End" option 808 by, e.g., pressing on "End" 808, the incoming call is ended and is optionally sent to voicemail based on service capabilities and user preferences.

At block 724, the telecommunication device 102 detects a user interaction with "Volume" 806. Such an interaction could include pressing on "Volume" 806 or speaking "volume", as described above.

At block 726, the telecommunication device 102 updates the ambiently displayed image 104 to show higher and lower volume options or a bar representing a volume spectrum, enabling the user to increase or decrease the volume of the speaker projecting the voice of the conversation partner in the voice call. For example, as shown in FIG. 8, the updated ambiently displayed image 104 includes both a "Higher" option 810 and a "Lower" option 812 for increasing and decreasing the volume, respectively. A user may repeatedly press on either to change the volume. In other implementations, rather than "Higher" 810 and "Lower" 812, the ambiently displayed image 104 may depict a bar representing volume, with one end of the bar representing a maximum volume and the other representing a minimum volume. The user can change the volume by interacting with the bar by swiping along it in one direction or the other or by pressing a location on the bar.

At block 728, the telecommunication device 102 determines that the call has ended. The telecommunication device 102 may determine this in response to the user hanging up or the user's conversation partner hanging up. Referring again to FIG. 8, the ambiently displayed image 104 may automatically revert to presenting "Volume" 806 and "End" 808 if the user has not interacted with "Higher" 810 and "Lower" 812 in a predetermined period of time. The user may then select "End" 808 to terminate the call.

At block 730, the telecommunication device 102 updates the ambiently displayed image 104 to show a "Next" option. The "Next" option may enable the user to, for example, see a menu of options for the ambiently displayed image 104, such as the scrollable menus described in greater detail above.

Figure 9:
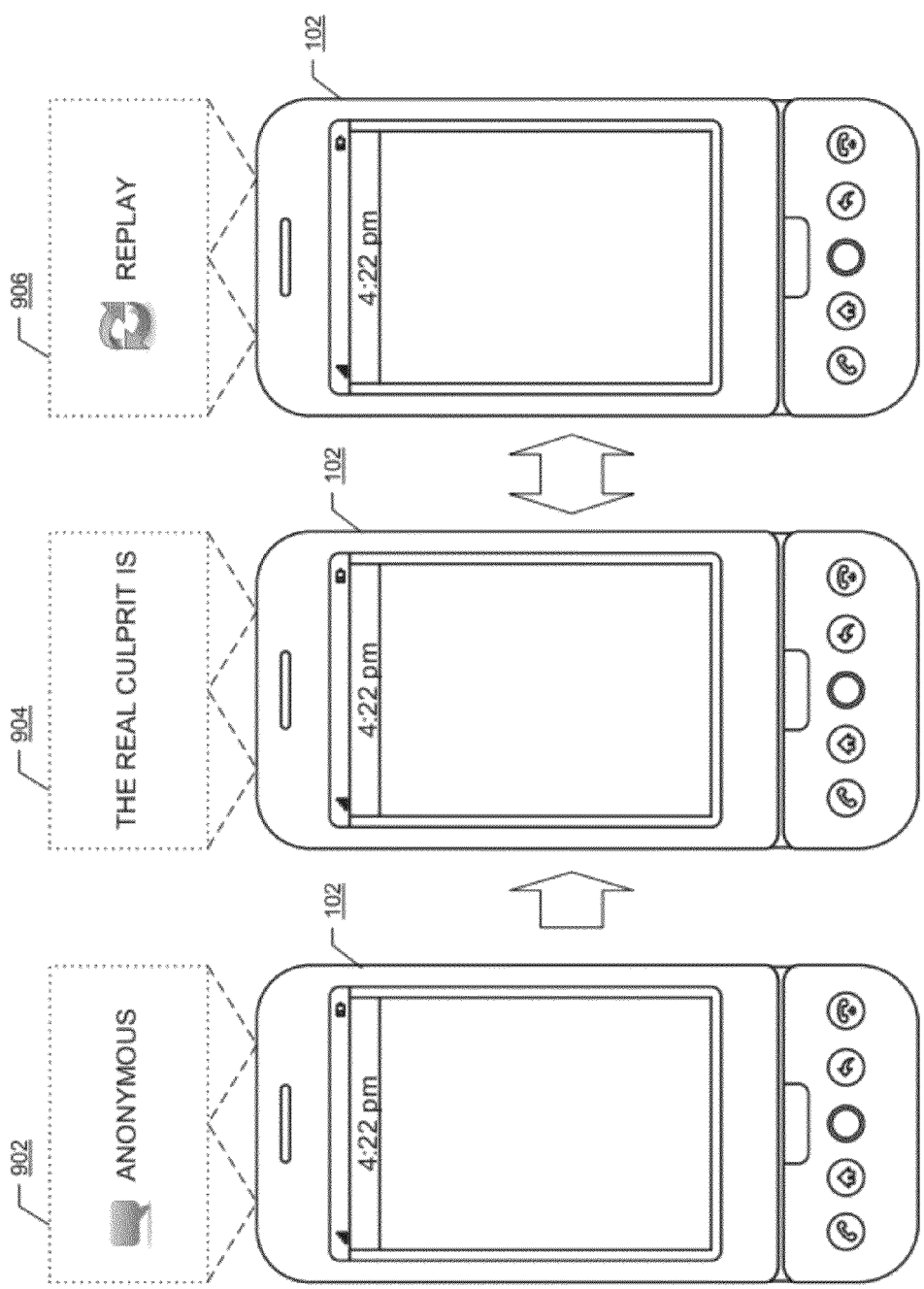
FIG. 9 shows a sequence of ambiently displayed images associated with a received message that are updated based on interactions with previous ambiently displayed images, in accordance with various embodiments.

In FIG. 7c, a flowchart of operations involving ambiently displayed image 104 that are performed in response to receiving a message is shown, in accordance with various embodiments. To better illustrate the operations shown in FIG. 7c, example ambiently displayed images 104 and the sequence of those ambiently displayed images 104 are illustrated in FIG. 9. The discussion of FIG. 9 is included with the discussion of FIG. 7c.

At block 732, the telecommunication device 102 receives a message, such as a text message or email. The message may be received via any sort of network such as a cellular network or wireless data network.

At block 734, the telecommunication device 102 projects in the ambiently displayed image 104 an option enabling the user to read the message. For example, as shown in FIG. 9, the telecommunication device 102 may project content 902 in the ambiently displayed image 104, the content 902 including a representation of a message (e.g., message icon) and the name of the person that the message is from. Content 902 both conveys information and serves as a user-selectable control.

At block 736, the telecommunication device 102 detects a user interaction with content 902. Such an interaction could include pressing on content 902 or speaking "read message" or some other verbal command, as described above.

At block 738, the telecommunication device 102 updates the ambiently displayed image 104 to display the message. The message is displayed all at once or in a scrolling fashion if the message will not fit in the ambiently displayed image 104. For example, as shown in FIG. 9, the updated ambiently displayed image 104 includes as content 904 a fragment of the message reading "The real culprit is." In various implementations, once the ambiently displayed image 104 begins display of the message, it continues until the complete message has been displayed.

At block 740, the telecommunication device 102 updates the ambiently displayed image 104 to display a "Replay" option. For example, as shown in FIG. 9, the updated ambiently displayed image 104 includes as content 906 an icon graphically depicting the replay option as well as the term "Replay." The telecommunication device 102 may automatically transition to showing content 906 after the completion of displaying the message. If the user then interacts with content 906, the message is replayed in an updated ambiently displayed image 104 again depicting the message. If the user does not interact with content 906 within a predetermined time, then the telecommunication device 102 instead updates the ambiently displayed image 104 to show a "Next" option. The "Next" option may enable the user to, for example, see a menu of options for the ambiently displayed image 104, such as the scrollable menus described in greater detail above.

Display Modes

Figure 10:
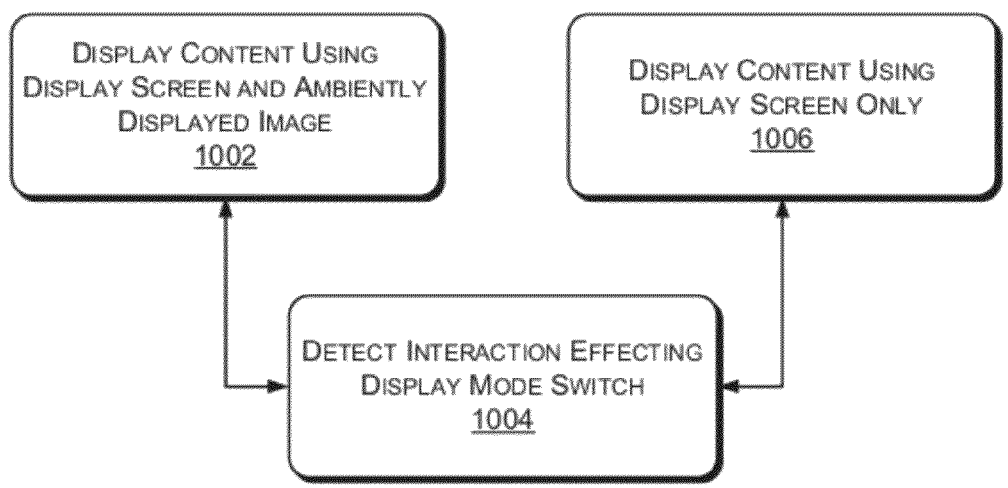
FIG. 10 shows a flowchart of operations of a telecommunication device to switch between display modes of the telecommunication device, in accordance with various embodiments.
Figure 11:
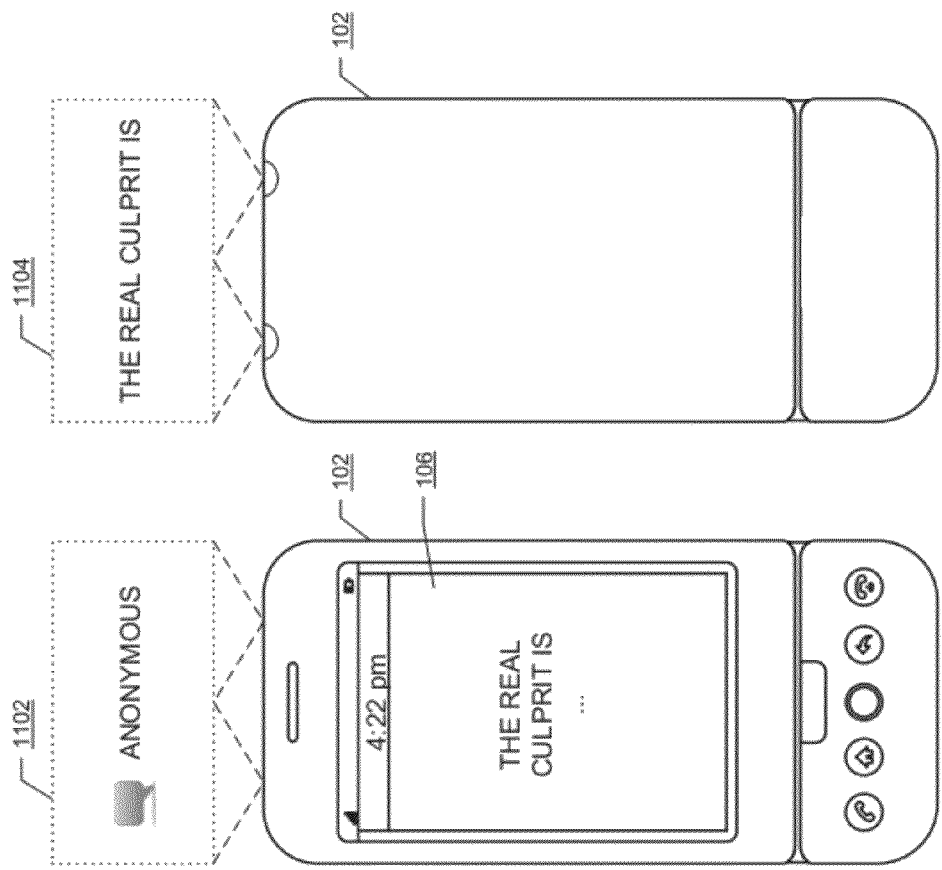
FIG. 11 shows ambiently displayed images based on telecommunication device display modes, in accordance with various embodiments.

FIG. 10 shows a flowchart of operations of a telecommunication device 102 to switch between display modes of the telecommunication device 102, in accordance with various embodiments. To better illustrate the operations shown in FIG. 10, example ambiently displayed images 104 shown in different display modes are illustrated in FIG. 11. The discussion of FIG. 11 is included with the discussion of FIG. 10. The operations may be performed in hardware, or as processor-executable instructions, or logic (software or firmware) that may be executed by one or more processors. Such logic is illustrated in FIG. 4 and mentioned above with reference to that figure.

At block 1002, the telecommunication device 102 operates in a first display mode, displaying content on both the display screen 410 and in the ambiently displayed image 104. For example, in FIG. 11, the telecommunication device 102 displays content 1102 in the ambiently displayed image 104, the content 1102 including the name of a message sender and a message icon, and content 106 on the display screen 410, the content 106 including the text of a received message. In various implementations, the first display mode may be a default display mode. In other implementations, it may be one of a number of available display modes selected based on a telecommunication device position or context or a platform or application context of the telecommunication device 102. For example, the first display mode may be defaulted to if the display screen 410 of the telecommunication device 102 is facing "up", or away from the surface 108 that the telecommunication device 102 is resting on, and a second display mode may be defaulted to if the display screen 410 is facing "down" and in contact with the surface 108 that the telecommunication device 102 is resting on. In the second display mode, content may be displayed only in the ambiently displayed image 104 and not on the display screen 410. As another example, the platform of the telecommunication device 102 may dynamically select a display mode based on the amount and size of the content to be displayed. If all the content to be displayed can be viewed from the ambiently displayed image 104, the platform of the telecommunication device 102 may cause the telecommunication device 102 to switch to an ambient-display-only mode, such as the above mentioned second display mode. The platform may do this in order to save power as the ambiently displayed image 104 may consume less power than the display screen 410. In further implementations, the telecommunication device 102 may operate in a display-screen-only mode or no-display mode. The telecommunication device 102 may default to the no-display mode at certain times of the day (e.g., when a user might be sleeping) and may default to the display-screen-only mode based on telecommunication device position/context or platform/application context. For example, if the user is engaged in a voice call and is not using the speaker phone mode, the telecommunication device 102 may default to a display-screen-only mode or a no-display mode, as the context would indicate that the user has the telecommunication device 102 to his or her ear and is unable to view the ambiently displayed image 104.

At block 1004, the telecommunication device 102 detects interaction affecting a display mode switch. For example, the telecommunication device 102 may be equipped with a key located somewhere on the telecommunication device 102. The display mode of the telecommunication device 102 is switched when the key is pressed. In other embodiments, the telecommunication device 102 utilizes another mechanism for switching the display mode. For example, the telecommunication device 102 may have a gyroscope that senses a motion, such as shaking, or a change in position, allowing the users to shake or move the telecommunication device 102 in some manner to switch the display mode. In one implementation, mentioned above, the display mode is switched by flipping the telecommunication device so that the display screen 410 faces either towards or away from the surface 108. In some implementations, the telecommunication device 102 has four display modes, such as the both-displays, ambient-display-only, display-screen-only, and no-display modes described above. The telecommunication device 102 may detect an interaction that cycles through these modes in a predetermined order. Alternatively, the telecommunication device 102 may have one mechanism for turning on an off the ambiently displayed image 104 and another for turning on and off the display screen 410. The combinations of the states of these mechanisms may constitute the display modes.

In various implementations, the telecommunication device 102 switches the display mode in response to a command from a platform or application of the telecommunication device 102. Such a command may be provided independently of any detected interaction and may thus allow the telecommunication device 102 to switch display modes without providing a mechanism enabling the user to switch modes or without requiring the user to make use of a provided mechanism. Examples of the platform or an application causing a display mode switch are described above at block 1002 with respect to defaulting to one display mode or another.

At block 1006, the telecommunication device 102 operates in the above-described second display mode, displaying content only in the ambiently displayed image 104. For example, in FIG. 11, the telecommunication device 102 displays content 1104 in the ambiently displayed image 104, the content 1104 including all or a part of the received message that was displayed on the display screen 410 in the first display mode, and does not display anything on display screen 410. As can be seen in FIG. 11, the display screen 410 of telecommunication device 102 may be facing downwards towards the surface 108 while in the second display mode. Alternatively, the display screen 410 may be facing upwards but still be turned off while the telecommunication device 102 is in the second display mode.

Extended Display

Figure 12:
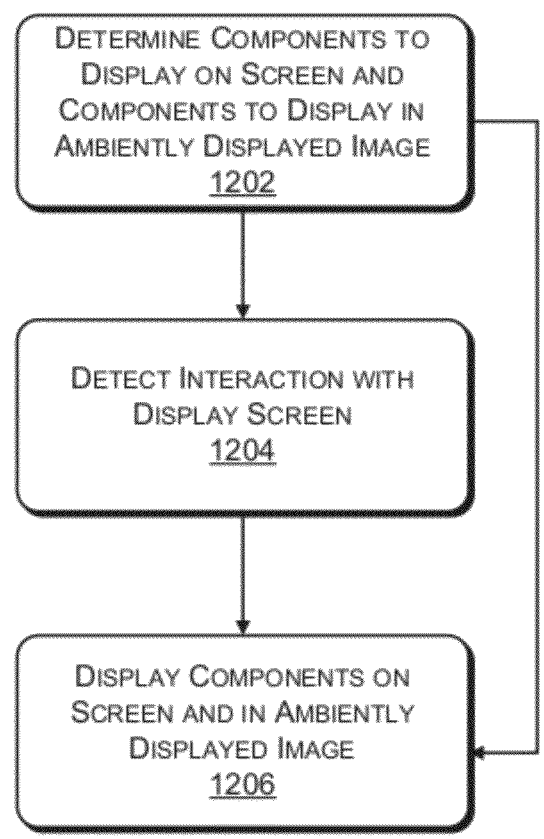
FIG. 12 shows a flowchart of operations of a telecommunication device to generate and project an ambiently displayed image as an extension of content shown on a telecommunication device display screen, in accordance with various embodiments.
Figure 13:
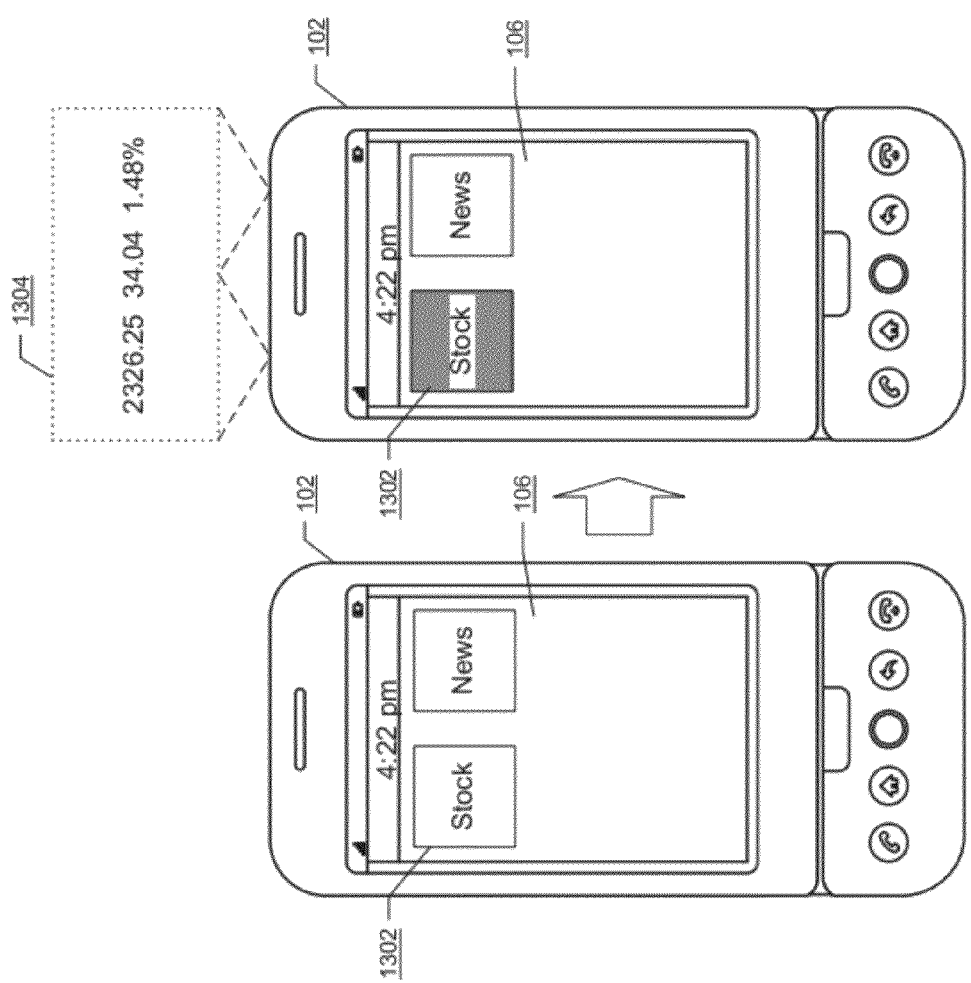
FIG. 13 shows an ambiently displayed image serving as an extended display of a telecommunication device, in accordance with various embodiments.

FIG. 12 shows a flowchart of operations of a telecommunication device 102 to generate and project an ambiently displayed image 104 as an extension of content 106 shown on a telecommunication device display screen 410, in accordance with various embodiments. To better illustrate the operations shown in FIG. 12, an example ambiently displayed image 104 projected as an extension of content 106 is illustrated in FIG. 13. The discussion of FIG. 13 is included with the discussion of FIG. 12. The operations may be performed in hardware, or as processor-executable instructions, or logic (software or firmware) that may be executed by one or more processors. Such logic is illustrated in FIG. 4 and mentioned above with reference to that figure.

At block 1202, the telecommunication device 102 determines user interface components and content to display on the display screen 410 and components and content to display in the ambiently displayed image 104. For example, in FIG. 13, the telecommunication device 102 may receive periodic updates of financial information, such as stock market updates. The telecommunication device 102 may determine that a selectable icon 1302 representing an option to see the received information will be displayed on the display screen 410 and may determine that the received information is to be displayed as content 1304 in the ambiently displayed image 104. In various implementations, these determinations are made based on hierarchical relationships between the content to be displayed in the different displays. For example, higher level information or graphics may be displayed on the display screen 410 and more detailed information may be displayed in the ambiently displayed image 104. In other implementations, one of the display screen 410 or ambiently displayed image 104 may be used as an overflow for the other when the user interface components or content will not fit completely in one of these. For instance, if the user interface includes more icons than can be displayed on display screen 410, the ambiently displayed image 104 may function as an extension of the display screen 410, displaying the icons that cannot be displayed on the display screen 410.

At block 1204, the telecommunication device 102 detects interaction with the display screen 410. Referring to FIG. 13, the telecommunication device 102 may detect a user selection of the icon 1302 representing the option to see financial information. In some implementations, the telecommunication device 102 may detect the interaction through the display screen 410, which may be touch-sensitive.

At block 1206, the telecommunication device 102 projects and displays user interface components or content in the ambiently displayed image 104. For example, as shown in FIG. 13, the telecommunication device 102 may project in ambiently displayed image 104 as content 1304 the received financial information mentioned above. Such information may include an index, such as the DOW Jones industrial average, the change to that index for the day, and the percentage change. In addition to projecting the content 1304 in the ambiently displayed image 104, the telecommunication device 102 may update the icon 1302 displayed on the display screen 410 to indicate that the icon 1302 has been selected and that the content 1304 in the ambiently displayed image 104 is related to the icon 1302. Such an update may include a change in the color of the icon 1302 or highlighting or shadowing of the icon 1302. In various implementations, the telecommunication device 102 may project content 1304 in the ambiently displayed image 104 for a predetermined amount of time or until the user interacts with the content displayed on the display screen 410 to select a different icon or to select icon 1302 a second time. Such a second interaction with icon 1302 may be the equivalent of choosing to "turn off" the ambiently displayed image 104 of content 1304 associated with the icon 1302.

Multiple Ambiently Displayed Images

Figure 14:
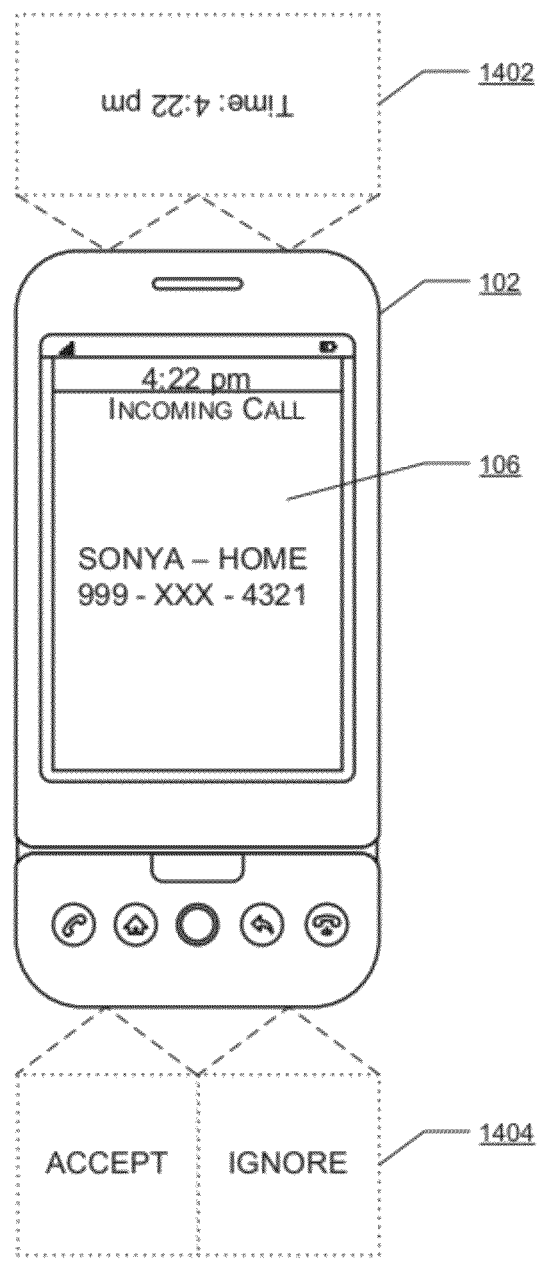
FIG. 14 shows a telecommunication device equipped with multiple projection apparatuses capable of projecting a first ambiently displayed image and a second ambiently displayed image.

FIG. 14 shows a telecommunication device 102 equipped with multiple projection apparatuses 110 capable of projecting a first ambiently displayed image 1402 and a second ambiently displayed image 1404. These projection apparatuses 110 may be located at any edge or edges of the telecommunication device 102 and internally to the telecommunication device 102.

In some implementations, the first and second ambiently displayed images 1402 and 1404 are oriented to be viewed by different viewers. For example, as shown in FIG. 14, selectable options displayed in response to an incoming call may be displayed in a first orientation in the ambiently displayed image 1304 for viewing by a first user and the time of day may be displayed in a second orientation in the ambiently displayed image 1302 to for viewing by a second user who is standing opposite the first user and facing the first user. In such implementations, the content of one ambiently displayed image, such as ambiently displayed image 1404, may be "private" content intended for viewing only by the user of the telecommunication device 102 and the content of the other ambiently displayed image may be "public" content for viewing by other users. Also, in such implementations, the first and second ambiently displayed images 1402 and 1404 may both have associated interactions zones enabling users to interact with both the first and second ambiently displayed images 1402 and 1404. For example, the first and second ambiently displayed images 1402 and 1404 may serve as user interfaces for a game two users are playing aginst one another.

In such an example implementation, one user's interaction with that user's ambiently displayed image 1402/1404 may cause the ambiently displayed image 1404/1404 displayed to the other user to be updated. In other implementations, the images or text of the first and second ambiently displayed images 1402 and 1404 may have the same orientation for viewing by the same user. In further implementations, two users may place their telecommunication devices 102 in proximity to each other, and the projection apparatuses 110 of the telecommunication device 102 may combine to render a single ambiently displayed image, in the manner described above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   predistorting, by a projection apparatus of a telecommunication device, an image so that the image appears without distortion when projected;
   projecting, by the projection apparatus of a telecommunication device, the predistorted image as an ambiently displayed image, the ambiently displayed image being projected at a location that is substantially immediately adjacent to the projection apparatus of the telecommunication device on a surface that is substantially parallel to a plane formed by a body of the telecommunication device, the body including the projection apparatus;
   detecting, by the telecommunication device, an interaction with the ambiently displayed image; and
   performing, by the telecommunication device, an action based on the detected interaction.

2. The method of claim 1, wherein the ambiently displayed image includes at least one of user interface controls, graphics, text, videos, images, screen savers, icons, graphic representations of sound, branding, or visual indicators including visual ringtones, alerts, or notifications.

3. The method of claim 1, wherein the ambiently displayed image is associated with an alarm clock, a calendar, telephony, text messaging, email, voicemail, a timer, content rendered on a display screen of the telecommunication device, a voice recorder, a music player, missed calls, social networking, application notifications, or location information.

4. The method of claim 1, wherein the interaction is one of a pressing, a swiping, a multi-tap, a double tap, a press-and-hold, or a multiple-finger-press motion.

5. The method of claim 1, wherein the action is one of answering or terminating a call, adjusting volume, reading a message, or accepting a calendar appointment.

6. The method of claim 1, further comprising turning the ambiently displayed image on or off in response to user interaction with the telecommunication device.

7. The method of claim 1, wherein the ambiently displayed image is an extension of a user interface displayed on a display screen of the telecommunication device, part of the user interface being displayed on the display screen and part being displayed in the ambiently displayed image.

8. The method of claim 1, wherein the ambiently displayed image remains the same while content displayed on a display screen of the telecommunication device changes.

9. The method of claim 1, wherein the detecting is performed at least by a sensor, camera, or emitter and detector of the telecommunication device.

10. The method of claim 1, wherein the projecting is performed in response to an incoming call or a message.

11. The method of claim 10, wherein the ambiently displayed image includes graphics representing an answer call option and a drop call option.

12. The method of claim 11, further comprising:
   in response to detecting user interaction with the graphics representing the answer call option, projecting a first updated ambiently displayed image, the first updated ambiently displayed image including graphics representing a change volume option and the drop call option;
   in response to detecting user interaction with the graphics representing the change volume option, projecting a second updated ambiently displayed image, the second updated ambiently displayed image including graphics representing an increase volume option and a decrease volume option; and
   in response to an end of the incoming call, projecting a third updated ambiently displayed image, the third updated ambiently displayed image including a next option that, when selected, causes the telecommunication device to present a menu of ambiently displayed image options.

13. The method of claim 10, wherein the ambiently displayed image includes a representation indicating receipt of a new message.

14. The method of claim 13, further comprising:
   in response to detecting user interaction with the representation, projecting a first updated ambiently displayed image, the first updated ambiently displayed image showing a portion of the new message and automatically scrolling through the new message; and
   at the end of the new message, projecting a second updated ambiently displayed image, the second updated ambiently displayed image including graphics representing a replay option.

15. The method of claim 1, further comprising:
   projecting a second ambiently displayed image at a second location proximate to the telecommunication device on the surface;
   detecting a second interaction with the second ambiently displayed image; and
   performing a second action based on the detected interaction.

16. A non-transitory computer-readable medium comprising a plurality of executable instructions stored on the non-transitory computer-readable medium that are configured to program a telecommunication device to perform operations including:
   predistorting, by a projection apparatus of the telecommunication device, an image so that the image appears without distortion when projected;
   projecting, by the projection apparatus of the telecommunication device, the predistorted image as an ambiently displayed image, the ambiently displayed image being projected at a location that is substantially immediately adjacent to the projection apparatus of the telecommunication device on a surface that is substantially parallel to a plane formed by a body of the telecommunication device, the body including the projection apparatus;
   detecting, by the telecommunication device, an interaction with the ambiently displayed image; and
   performing, by the telecommunication device, an action based on the detected interaction.

17. The non-transitory computer-readable medium of claim 16, wherein the operations further comprise:
- in a first display mode of the telecommunication device, displaying first content using a display screen of the telecommunication device and second content in the ambiently displayed image, the first and second content being different content;
- in a second display mode of the telecommunication device, displaying the first content using only the ambiently displayed image; and
- detecting a further interaction with the telecommunication device effecting a display mode switch.

18. The non-transitory computer-readable medium of claim 17, wherein the further interaction comprises flipping the telecommunication device so that the display screen rests on a surface or flipping the telecommunication device so that the display screen no longer rests on a surface.

19. The non-transitory computer-readable medium of claim 16, wherein the ambiently displayed image includes at least one of user interface controls, graphics, text, videos, images, screen savers, icons, graphic representations of sound, branding, or visual indicators including visual ringtones, alerts, or notifications.

20. The non-transitory computer-readable medium of claim 16, wherein the interaction is one of a pressing, a swiping, a multi-tap, a double tap, a press-and-hold, or a multiple-finger-press motion.

* * * * *